(12) United States Patent
Lablans

(10) Patent No.: US 10,650,373 B2
(45) Date of Patent: May 12, 2020

(54) METHOD AND APPARATUS FOR VALIDATING A TRANSACTION BETWEEN A PLURALITY OF MACHINES

(71) Applicant: Peter Lablans, Morris Township, NJ (US)

(72) Inventor: Peter Lablans, Morris Township, NJ (US)

(73) Assignee: Ternarylogic LLC, Morristown, NJ (US)

(*) Notice: Subject to any disclaimer, the term of this patent is extended or adjusted under 35 U.S.C. 154(b) by 599 days.

(21) Appl. No.: 15/244,985

(22) Filed: Aug. 23, 2016

(65) Prior Publication Data

US 2016/0366109 A1 Dec. 15, 2016

Related U.S. Application Data

(63) Continuation-in-part of application No. 14/975,841, filed on Dec. 20, 2015, now abandoned, and a
(Continued)

(51) Int. Cl.
*G06Q 20/34* (2012.01)
*H04L 29/06* (2006.01)
(Continued)

(52) U.S. Cl.
CPC ............ *G06Q 20/34* (2013.01); *G06F 5/012* (2013.01); *G06F 7/4876* (2013.01); *G06F 7/724* (2013.01);
(Continued)

(58) Field of Classification Search
CPC ... H04L 9/3236; H04L 9/3247; H04L 63/123; G06Q 30/018; G06Q 20/34; G06F 11/1012
See application file for complete search history.

(56) References Cited

U.S. PATENT DOCUMENTS 6,829,355 B2 12/2004 Lilly
7,369,661 B2 * 5/2008 Graunke .................... H04L 9/12
348/E7.056

(Continued)

OTHER PUBLICATIONS

FIPS PUB 180-4—Secure Hash Standard (SHS), Aug. 2015, 31 pages, Information Technology Laboratory National Institute of Standards and TechnologyGaithersburg, MD 20899-890.
(Continued)

*Primary Examiner* — Calvin L Hewitt, II
*Assistant Examiner* — Sima Asgari

(57) ABSTRACT

A first and a second device both have access to a series of data representing configurations of hash functions. The first device selects a first configuration and implements a hashing function from the selected configuration. A hash value is generated and transmitted to the second device. The second device has hashing configurations stored on a memory. A processor in the second device selects the first hashing configuration to implement the hash function from the first configuration and generates a hash value. The hash values generated on the first device and generated on the second device are compared to determine an action. The first configuration is disabled and a new configuration is retrieved. At least 4 and more preferably at least 5 different n-state functions with n>2 are used in a hash function.

18 Claims, 14 Drawing Sheets

Related U.S. Application Data continuation-in-part of application No. 14/752,997, filed on Jun. 28, 2015, now abandoned, and a continuation-in-part of application No. 14/622,860, filed on Feb. 14, 2015, now Pat. No. 9,218,158, and a continuation-in-part of application No. 14/324,217, filed on Jul. 6, 2014, now Pat. No. 9,100,166, which is a continuation of application No. 13/118,767, filed on May 31, 2011, now Pat. No. 8,817,928, and a continuation-in-part of application No. 12/980,504, filed on Dec. 29, 2010, now Pat. No. 8,577,026.

(60) Provisional application No. 62/209,331, filed on Aug. 24, 2015, provisional application No. 61/350,247, filed on Jun. 1, 2010.

(51) Int. Cl.

| | | |
|---|---|---|
| *H04L 9/06* | (2006.01) | |
| *G06Q 20/40* | (2012.01) | |
| *H03M 7/00* | (2006.01) | |
| *G06F 5/01* | (2006.01) | |
| *G06F 7/487* | (2006.01) | |
| *G06F 7/72* | (2006.01) | |
| *H04K 3/00* | (2006.01) | |

(52) U.S. Cl.
CPC ............ *G06Q 20/401* (2013.01); *H03M 7/00* (2013.01); *H04L 9/0643* (2013.01); *H04L 63/0428* (2013.01); *H04K 3/25* (2013.01); *H04K 3/827* (2013.01)

(56) References Cited

U.S. PATENT DOCUMENTS

| | | | |
|---|---|---|---|
| 8,259,935 B2 * | 9/2012 | Riedl | H04L 9/0643 380/260 |
| 9,379,891 B2 | 8/2016 | Yoon et al. | |
| 2006/0171530 A1 * | 8/2006 | Futa | H04L 9/3236 380/28 |
| 2009/0089584 A1 * | 4/2009 | Bender | H04L 9/3236 713/176 |
| 2012/0284533 A1 | 11/2012 | Assche et al. | |
| 2014/0195782 A1 | 7/2014 | Yap et al. | |
| 2014/0281761 A1 * | 9/2014 | Lablans | G06F 11/1012 714/701 |

OTHER PUBLICATIONS

Barreto et al.; Whirlwind: a new cryptographic hash function, Des. Codes Cryptogr. (2010) 56:141-162;Apr. 16, 2010, published online.

FIPS PUB 202—SHA-3 Standard: Permutation-Based Hash and Extendable-Output Functions, Aug. 2015, 29 pages, Information Technology Laboratory National Institute of Standards.

Bertoni et al. ; Cryptographic sponge functions, version .1, Jan. 14, 2011, 93 pages, published on-line.

FIPS PUB 180-2, Secure Hash Standard (with Change Notice 1), Feb. 25, 2004, 79 pages; Information Technology Laboratory National Institute of Standards and Technology.

* cited by examiner

```
1    % © Copyright 2015 Ternarylogic LLC. All Rights Reserved
2    % title: seq4mod.m
3    % a PN 4-state sequence generator of 63 different states
4    sc4=[0 1 2 3;1 0 3 2;2 3 0 1;3 2 1 0]+1;  % the 4-state switching function
5    m4=[0 0 0 0;0 1 2 3;0 2 3 1;0 3 1 2]+1;
6    shifts=[1 3 2 ];
7    in=shifts(3);
8    for i0=4:4
9        inv0=m4(i0,:);
10       for i1=3:3
11       inv1=m4(i1,:);
12       for i2=1:1
13       inv2=m4(i2,:);
14       shifts=[1 3 2 ];
15   for k=1:63
16       in=shifts(3);
17       in0=inv0(in);
18       in1=inv1(in);
19       in2=inv2(in);
20       t2=sc4(in,shifts(2));
21       t1=sc4(in,shifts(1));
22       mel(k)=((shifts(1)-1)*4^2)+((shifts(2)-1)*4^1)+((shifts(3)-1)*4^0);
23       out(k)=in0;
24       shifts(3)=t2;
25          shifts(2)=t1;
26          shifts(1)=in0;
27   end
28   ccf3mod(out,out);  % correlation
29          end
30          end
31   end
32          mel'
```

FIG. 5 ans =

|  |  |  |
|---:|---:|---:|
| 9 | 28 | 51 |
| 55 | 7 | 35 |
| 34 | 46 | 39 |
| 18 | 17 | 38 |
| 30 | 49 | 19 |
| 29 | 57 | 43 |
| 50 | 59 | 37 |
| 22 | 33 | 60 |
| 31 | 61 | 15 |
| 40 | 58 | 44 |
| 10 | 20 | 11 |
| 24 | 5 | 45 |
| 6 | 52 | 62 |
| 27 | 13 | 21 |
| 41 | 54 | 48 |
| 63 | 23 | 12 |
| 32 | 42 | 3 |
| 8 | 16 | 47 |
| 2 | 4 | 36 |
| 26 | 1 |  |
|  | 53 |  |
|  | 56 |  |
|  | 14 |  |
|  | 25 |  |

```
36      % the scrambling cycle
37 -    for k=1:len
38 -        in=shifts(4);
39 -        in3=inv3(in);
40 -        in2=inv2(in);
41 -        in1=inv1(in);
42 -        int0=scr(in,inx(k));
43 -        in0=inv0(int0);
44 -        t3=scf3(in3,shifts(3));
45 -        t2=scf2(in2,shifts(2));
46 -        t1=scf1(in1,shifts(1));
47
48 -        out(k)=in0;
49 -        shifts(4)=t3;
50 -        shifts(3)=t2;
51 -        shifts(2)=t1;
52 -        shifts(1)=in0;
53 -    end
54      % extension cycle
55 -    for ir=len+1:cycl(tel) % an extended cycle
56 -        in=shifts(4);
57 -        in3=inv3(in);
58 -        in2=inv2(in);
59 -        in1=inv1(in);
60 -        in0=inv0(in);
61 -        t3=scf3(in3,shifts(3));
62 -        t2=scf2(in2,shifts(2));
63 -        t1=scf1(in1,shifts(1));
64
65 -        out(k)=in0;
66 -        shifts(4)=t3;
67 -        shifts(3)=t2;
68 -        shifts(2)=t1;
69 -        shifts(1)=in0;
70 -    end
71 - end
```

FIG. 15

```
1   % variable length 4-state scrambler, change length after i=8 from 4 to 5
2   shifts4=[2 3 1 4 2];
3   sc4=[1 2 3 4;2 1 4 3;3 4 1 2;4 3 2 1];
4   % set initial switch
5   s1=1
6   s21=~s1
7   s22=s21;
8   for i=1:16
9       s1=(i<=8);% set when length changes
10      s21=~s1;
11      s22=s21;
12      t4=shifts4(4);
13      t3=shifts4(3);
14      t2=shifts4(2);
15      t1=shifts4(1);
16      if s1==1;% when i is smaller than 9 length is 4
17          in=shifts4(4);
18          r4=sc4(in,t3);
19          r3=sc4(in,t2);
20          r2=sc4(in,t1);
21          out(i)=sc4(in,seq4in(i));
22          shifts4(5)=shifts4(4);
23          shifts4(4)=r4;
24          shifts4(3)=r3;
25          shifts4(2)=r2;
26          shifts4(1)=out(i);
27      else % when i is greater than 8 length is 5
28          in=shifts4(5);
29          r5=sc4(in,t4);
30          r4=sc4(in,t3);
31          r3=sc4(in,t2);
32          r2=sc4(in,t1);
33          out(i)=sc4(in,seq4in(i));
34          shifts4(5)=r5;
35          shifts4(4)=r4;
36          shifts4(3)=r3;
37          shifts4(2)=r2;
38          shifts4(1)=out(i);
39      end
40      t4=shifts4(4);
41      t3=shifts4(3);
42      t2=shifts4(2);
43      t1=shifts4(1);
44  end
```

FIG. 22

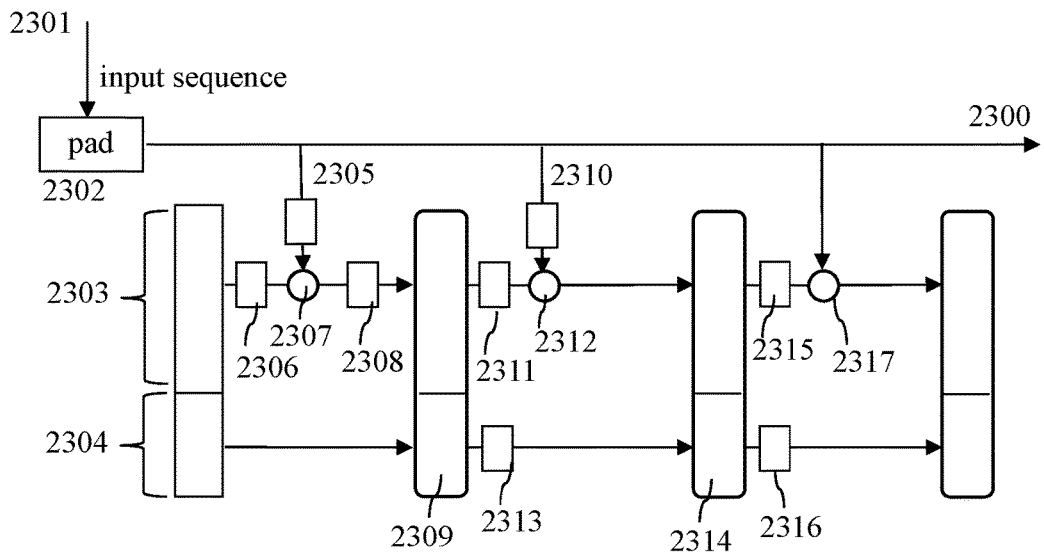
FIG. 23
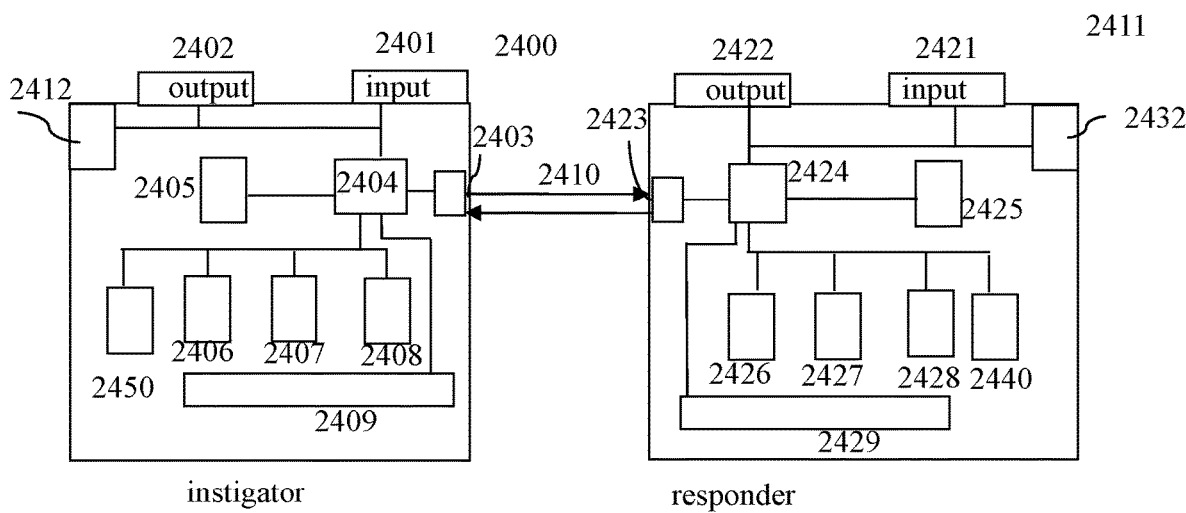
FIG. 24
```
114    % generate w88 as 8-state message schedule
115 -  for i=17:80
116 -     u11=w88(i-3,:);
117 -     u12=w88(i-8,:);
118 -     u13=w88(i-14,:);
119 -     u14=w88(i-16,:);
120 -     ur=xor8all(u11,u12,u13,u14); % combine 8-state words
121 -     w88(i,:)=ur;
122 -  end
```
FIG. 25

```
1   function y=xor8all(xt3,xt8,xt14,xt16)
2   % generate additional 8-state words in schedule
3   % possible 8-state switching functions
4   fun1=[8 7 6 5 4 3 2 1;7 6 5 4 3 2 1 8;6 5 4 3 2 1 8 7;5 4 3 2 1 8 7 6;
5          4 3 2 1 8 7 6 5;3 2 1 8 7 6 5 4;2 1 8 7 6 5 4 3;1 8 7 6 5 4 3 2];
6   fun1=[0 1 2 3 4 5 6 7;1 0 4 7 2 6 5 3;2 4 0 5 1 3 7 6;3 7 5 0 6 2 4 1;
7          4 2 1 6 0 7 3 5;5 6 3 2 7 0 1 4;6 5 7 4 3 1 0 2;7 3 6 1 5 4 2 0]+1;
8   fun1=[1 2 3 4 5 6 7 8;2 3 4 5 6 7 8 1;3 4 5 6 7 8 1 2;4 5 6 7 8 1 2 3;
9          5 6 7 8 1 2 3 4;6 7 8 1 2 3 4 5;7 8 1 2 3 4 5 6;8 1 2 3 4 5 6 7];
10  and8=[0 0 0 0 0 0 0 0;0 1 2 3 4 5 6 7;0 2 3 4 5 6 7 1;0 3 4 5 6 7 1 2;
11         0 4 5 6 7 1 2 3;0 5 6 7 1 2 3 4;0 6 7 1 2 3 4 5;0 7 1 2 3 4 5 6]+1;
12  % prepare input for origin 1
13  xt3=xt3+1;
14  xt8=xt8+1;
15  xt14=xt14+1;
16  xt16=xt16+1;
17  % determine size of data
18  lent=size(xt3);
19  len=lent(2);
20  % combine data in accordance with size and active fun1
21  for i=1:len
22      b11=fun1(xt3(i),xt8(i));
23      b12=fun1(b11,xt14(i));
24      yi(i)=fun1(b12,xt16(i))-1;
25  end
26  % rotate the result
27      y(len)=yi(1);
28      y(1:len-1)=yi(2:len);
```

FIG. 26

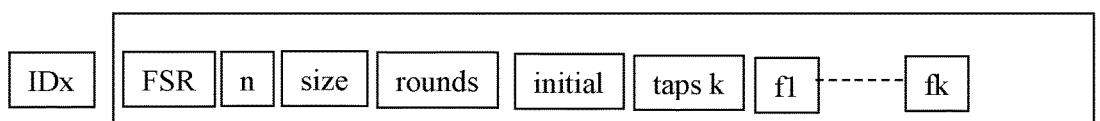

FIG. 27

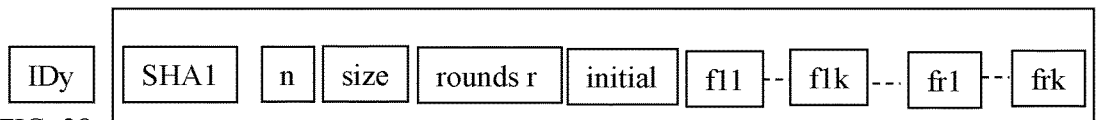

FIG. 28

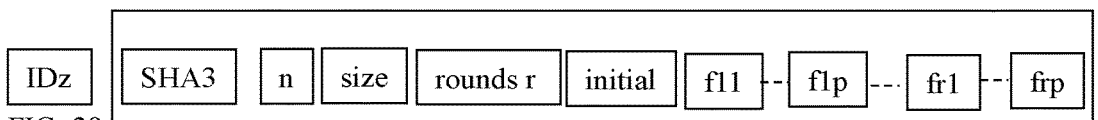

FIG. 29

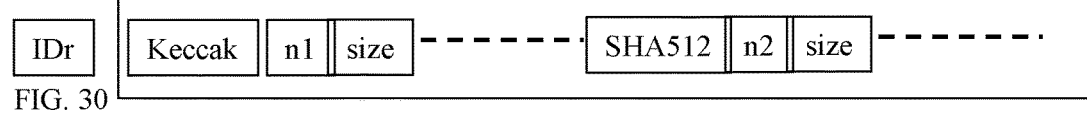

FIG. 30

METHOD AND APPARATUS FOR VALIDATING A TRANSACTION BETWEEN A PLURALITY OF MACHINES

CROSS-REFERENCE TO RELATED CASES

This application claims the benefit of U.S. Provisional Patent Application Ser. No. 62/209,331 filed on Aug. 24, 2015 which is incorporated herein by reference. This application claims the benefit and is a continuation-in-part of patent application Ser. No. 14/975,841 filed on Dec. 20, 2015 which is a continuation-in-part and claims the benefit of patent application Ser. No. 14/622,860 filed on Feb. 14, 2015 now U.S. Pat. No. 9,218,158 issued on Dec. 22, 2015 which claims the benefit and is a continuation-in-part of patent application Ser. No. 12/980,504 filed on Dec. 29, 2010 now U.S. Pat. No. 8,577,026 issued on Nov. 5, 2013, which are all incorporated herein by reference in their entirety. This application claims the benefit and is a continuation-in-part of patent application Ser. No. 14/752,997 filed on Jun. 28, 2015, which is a continuation-in-part of and claims the benefit U.S. Non-provisional patent application Ser. No. 14/324,217 filed on Jul. 6, 2014 now U.S. Pat. No. 9,100,166 issued on Aug. 4, 2015, which is a continuation of and claims the benefit of U.S. Non-provisional patent application Ser. No. 13/118,767 filed on May 31, 2011 now U.S. Pat. No. 8,817,928 issued on Aug. 26, 2014, which claims the benefit of U.S. Provisional Patent Application Ser. No. 61/350,247, filed Jun. 1, 2010, all of the above which are all incorporated by reference herein in their entirety.

BACKGROUND OF THE INVENTION

Mobile and portable wireless digital devices are nowadays commonly used to communicate with other devices connected either through a public or private network or through direct, sometimes ad hoc, wireless connections. Often, highly private or sensitive information is exchanged over a wireless connection that may be or may not be secure. Access may involve access to a bank account or access to a house, a garage or a car. In general, it is desirable to keep the information that is exchanges as private as possible or make sure access is authorized.

The information itself can be protected by coding or cryptography, using certification and public/private key approaches. Cryptography goes a long way to protect data during transmission. That is: even if the signal is stolen by a malfeasant, the coding with some cipher protects a user against unauthorized access to private data or private data access. Unfortunately, servers connected to the Internet are increasingly subject to hacking. This may include access to keys that may enable malfeasants to access accounts or sensitive files.

Validation or authorization for access in most cases takes place by way of a fairly constant or invariant parameter, such as a user name and a password. It is believed that currently no validation of a device or a user exists that is variable and impossible or at least very difficult to predict.

Accordingly, novel and improved methods and devices are required that use difficult to predict parameters to validate or authorize a device or a user to gain access to a device, an accounts, a building, a vehicle or any other protected property.

SUMMARY OF THE INVENTION

In accordance with one aspect of the present invention, method and apparatus for scrambling a ternary signal with a scrambler is provided. The ternary signal is able to assume one of three states. The scrambler has a first scrambling ternary logic device that implements a ternary logic function, sc, and a scrambling logic circuit.

In accordance with an aspect of the present invention a hashing method is provided, comprising: retrieving from a memory of a first computing device a first hashing configuration that determines a first hashing device, the first hashing configuration being selected from a plurality of different hashing configurations stored on the memory, the plurality of different hashing configurations may be specific to the first computing device and to a second computing device authorized to receive an instruction from the first computing device; a processor on the first computing device generating a hash value in accordance with the first hashing configuration; transmitting the hash value to the second computing device by the first computing device; and the first computing device disabling the first hashing configuration in the memory.

In accordance with a further aspect of the present invention the hashing method is provided, wherein the message data includes an identification of the first hashing configuration.

In accordance with yet a further aspect of the present invention the hashing method is provided, further comprising: the first computing device transmitting the message data that includes the identification of the first hashing configuration to the second computing device, wherein the identification of the first hashing configuration provides no information of a structure of the first hashing configuration.

In accordance with yet a further aspect of the present invention the hashing method is provided, further comprising: the second computing device retrieving the first hashing configuration from a memory of the second computing device based on the identification of the first configuration received from the first computing device, the memory of the second computing device storing the plurality of different hashing configurations; the second computing device generating a hash value from the message data in accordance with the first hashing configuration retrieved from the memory of the second computing device; the second computing device comparing the hash value received from the first computing device with the hash value generated by the second computing device; and the second computing device activating a mechanism based on the comparing of the hash value received from the first computing device with the hash value generated by the second computing device.

In accordance with yet a further aspect of the present invention the hashing method is provided, further comprising: the second computing device disabling the first hashing configuration from the memory of the second computing device.

In accordance with yet a further aspect of the present invention the hashing method is provided, wherein the configurations in the plurality of configurations are stored in an ordered manner in the memories of the first and second computing devices and wherein unused hashing configurations in a position preceding the first hashing configuration are disabled.

In accordance with yet a further aspect of the present invention the hashing method is provided, wherein the mechanism is a lock.

In accordance with yet a further aspect of the present invention the hashing method is provided, wherein the first hashing configuration includes the use of an n-state 2-input/single output switching function with n an integer greater than 2 and symbols on the inputs of the n-state switching function being 0 will generate an output symbol that is not 0.

In accordance with yet a further aspect of the present invention the hashing method is provided, wherein the first hashing configuration includes a use of four different n-state 2-input/single output switching functions with n an integer greater than 2.

In accordance with yet a further aspect of the present invention the hashing method is provided, wherein the message data include a financial transaction.

In accordance with yet a further aspect of the present invention the hashing method is provided, further comprising: the first computing device determining a second hash value based on the message data in accordance with a second hashing configuration retrieved from the memory of the first computing device; the first computing device transmitting the message data with the hash value to the second computing device; the first computing device storing the second hash value in the memory of the first computing device; the second computing device retrieving a first and a second configuration of a hashing device and generating a first and a second hash value in accordance with the first and second hashing configurations, respectively and based on the received message data; the second computing device transmitting the second hash value to the first computing device; and the financial transaction is terminated when the second hash value sent by the second computing device is different from the second hash value generated by the first computing device and stored in the memory of the first computing device.

In accordance with yet a further aspect of the present invention the hashing method is provided, wherein the first computing device is selected from the group consisting of a fob, a door opener, a smartphone, a tablet, a credit card, an ATM (automatic teller machine) card, a SIM (subscriber identification module) card and a chip card.

In accordance with another aspect of the present invention an apparatus is provided, comprising: a memory to store data including instructions; a processor enabled to retrieve data from the memory including the instructions and to execute the instructions retrieved from the memory to perform the steps: retrieving from the memory a first hashing configuration that determines a first hashing device, the first hashing configuration being selected from a plurality of different hashing configurations stored on the memory, the plurality of different hashing configurations being specific to the apparatus and to the computing device; generating a hash value based on message data in accordance with the first hashing configuration; transmitting the hash value to a computing device by the first apparatus; and disabling the first hashing configuration in the memory.

In accordance with yet another aspect of the present invention the apparatus is provided, wherein the message data includes an identification of the first hashing configuration.

In accordance with yet another aspect of the present invention the apparatus is provided, further comprising the processor enabled to perform the step: transmitting the message data that includes the identification of the first hashing configuration to the computing device, wherein the identification of the first hashing configuration provides no information of a structure of the first configuration.

In accordance with yet another aspect of the present invention the apparatus is provided, further comprising: the computing device retrieving the first hashing configuration from a memory of the computing device based on the identification of the first hashing configuration received from the apparatus, the memory of the computing device storing the plurality of different hashing configurations; the computing device generating a hash value based on the first hashing configuration retrieved from the memory of the computing device; the computing device comparing the hash value received from the apparatus with the hash value generated by the computing device; and the computing activating a mechanism based on the comparing the hash value received from the apparatus with the hash value generated by the computing device.

In accordance with yet another aspect of the present invention the apparatus is provided, wherein the hashing configurations in the plurality of different hashing configurations are stored in an ordered manner in the memories of the apparatus and the computing device and wherein unused hashing configurations in a position preceding the first hashing configuration are disabled.

In accordance with yet another aspect of the present invention the apparatus is provided, wherein the mechanism is a lock.

In accordance with yet another aspect of the present invention the apparatus is provided, wherein the first hashing configuration includes a use of four different n-state 2-input/single output switching functions with n an integer greater than 2.

In accordance with yet another aspect of the present invention the apparatus is provided, wherein the apparatus is selected from the group consisting of a fob, a door opener, a smartphone, a tablet, a credit card, an ATM (automatic teller machine) card, a SIM (subscriber identification module) card and a chip card.

In accordance with a further aspect of the present invention a method of performing a cryptographic operation is provided, comprising: retrieving by a processor of a first hashing configuration from a memory that stores a plurality of different hashing configurations; the processor hashing message data in accordance with the first hashing configuration, and generating a hash value from the message data, wherein the first hashing configuration includes at least 4 different n-state 2-input/one output switching functions, each determined by a unique n-by-n switching table with n an integer greater than 2; and the processor disabling the first hashing configuration after generating the hash value.

DESCRIPTION OF THE DRAWINGS

FIG. 5 is a screenshot of a program that performs steps in accordance with various aspects of the present invention;

FIG. 6 is a screenshot of an output generated by a processor in accordance with various aspects of the present invention;

FIGS. 12 and 13 illustrate coders provided in accordance with various aspects of the present invention;

FIGS. 14 and 15 are screenshots of Matlab code that performs steps provided in accordance with various aspects of the present invention;

FIG. 22 is a screenshot of Matlab code that performs steps provided in accordance with various aspects of the present invention;

FIG. 23 is a hash function device in accordance with an aspect of the present invention;

FIG. 24 is an illustration of a system of two computing devices in accordance with an aspect of the present invention;

FIGS. 25 and 26 are screenshots of Matlab code that performs steps provided in accordance with various aspects of the present invention;

FIG. 27, FIG. 28, FIG. 29 and FIG. 30 are diagrams of hashing configurations in accordance with various aspects of the present invention.

DESCRIPTION OF THE INVENTION

Figure 1:
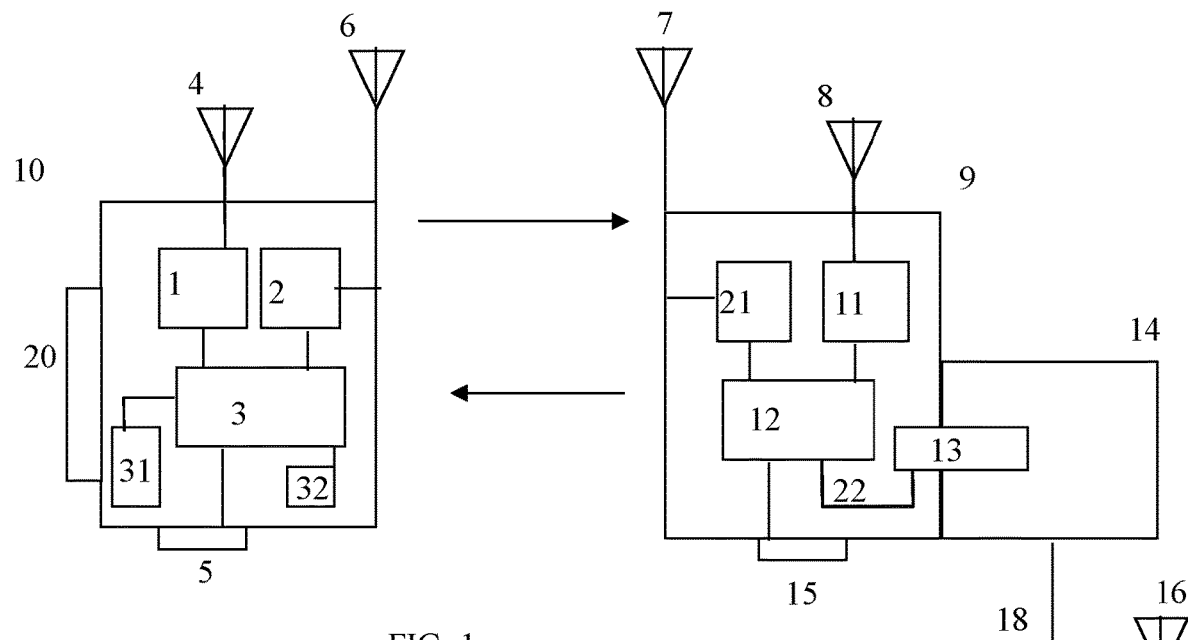
FIG. 1 is a diagram of a system with a transmitter and a receiver in accordance with various aspects of the present invention.

People increasingly use smartphones, tablets, portable computers, wearable computers and wirelessly connected computers to access buildings, vehicles, accounts, including bank accounts, sensitive data files or any other protected device or part of a device or structure. Commonly, security protection is provided by the use of user-names or other identifying data and a user or device specific password or PIN (personal identification number). An additional security layer is provided by encryption.

A disadvantage of the above security protection is that it is usually static and has to be deliberately changed to make unauthorized access to accounts and structures by stealing passwords or IDs more difficult. This is exemplified in the many known cases where passwords and social security numbers have been obtained by malfeasants. There are different ways in which access is obtained surreptitiously, for instance by stealing a signal or by stealing an access device or information from an access device and pretending to have authorization to have access to a device or to have authorization to have access.

One way to prevent unauthorized access is to use access data that is only used once, by either the to be accessed device as well as the accessing device. This prevents the known attack of suppressing reception of opening data, force a new set of data and apply the suppressed data for unauthorized access. Furthermore, the amount of potential opening data must be so large that prediction or even depletion of data is unlikely. However, there still is the issue of validating the opening device. Assume that a malfeasant has stolen data from an opening device and is trying to open a car or create data access with the stolen data. The use of this stolen data can be prevented by using an additional layer of protection.

In accordance with an aspect of the present invention an additional layer of security is provided by using variable data that is impossible or very difficult to predict or to replicate to validate a device. In accordance with an aspect of the present invention, one or more additional communication channels are provided to obtain the hard to predict data.

Different configurations are contemplated wherein security is important. One configuration is wherein the to be unlocked, enabled or activated device is itself mobile and wireless, such as a vehicle, including cars, trucks, boats, aircraft, and also mobile computing devices such as cell-phones, laptop computers and tablets. In one embodiment of the present invention the to be opened, unlocked or activated devices is stationary and includes communication circuitry to communicate over a wireless communication channel with a device that is required to open, unlock or activate the stationary device. In one embodiment of the present invention, the device that unlocks or activates the other device is mobile and has wireless communication capabilities and circuitry. Such an opening device may be a dedicated opener, often called a fob, a door opener, or a smartphone, a computer tablet or any other device that is mobile and wireless and is enabled, usually programmed, to serve as an opener. The opener may be built into another object that is mobile such as a car and is used to open a garage door for instance.

In accordance with an embodiment of the present invention an opening device has access to two separate communication systems with two different communication devices. For instance one circuit/channel combination is a Bluetooth communication combination. This enables a direct connection to another Bluetooth device. Another circuit/channel combination may be a WiFi combination, which allows access to a wide-area-network such as the Internet. The above provides one example of a dual communication circuit/channel combination. WiFi operates in the 2.4 and 5 Ghz band while Bluetooth operates in the 2.4 GHz band and may create some interference concerns. However, the bandwidth and modulation technologies of the communication channels are different. Access to a wide-area-network may also be achieved through for instance a cellular network which generally applies a different band (from around 800 MHz to about 2.7 GHz) with again different modulation techniques being applied.

FIG. 1 illustrates a digital transmission system in accordance with an embodiment of the present invention. An opening device 10 has a housing that contains a processor 3 that is preferably programmable and has memory to store data including instructions. Opener 10 has a first antenna 4 and communication circuit 1 to send and receive data from and to processor 3. Opener 10 has a second antenna 6 and communication circuit 2 to send and receive data from and to processor 3. A connector 5 enabled the processor to exchange data via a wired connection. Also part of opening device 10 is an input device 20, for instance a keyboard that may also serve as an output device such as a display screen and may be a touch screen. A second device 9 has a housing and a processor with memory 12, a first antenna 7 and communication circuit 21 to send and receive data from and to processor 12. Device or structure 9 has a second antenna 8 and communication circuit 11 to send and receive data from and to processor 12. A connector 15 enables the processor to exchange data via a wired connection. Processor 12 is connected via 22 to a device 13 that can be activated by the processor.

The device 13, which may be a lock or a bolt or a motor or a mechanism 14, but may also be an access to a memory or a storage device or a processor or a communication device or structure 14, which may be a fixed or mobile device or structure. For instance 14 may be a car or car door, a garage or a garage door or a part of a system or computer system that can be accessed through 13. Circuits in the structure or device 14 have access to a remote server 17, preferably through a connection 18 which may be a wired or a wireless connection. The remote server 17 has access to an antenna 16 and communication circuitry to communicate with devices 10 and/or 9 through a wide-area network.

Figure 2:
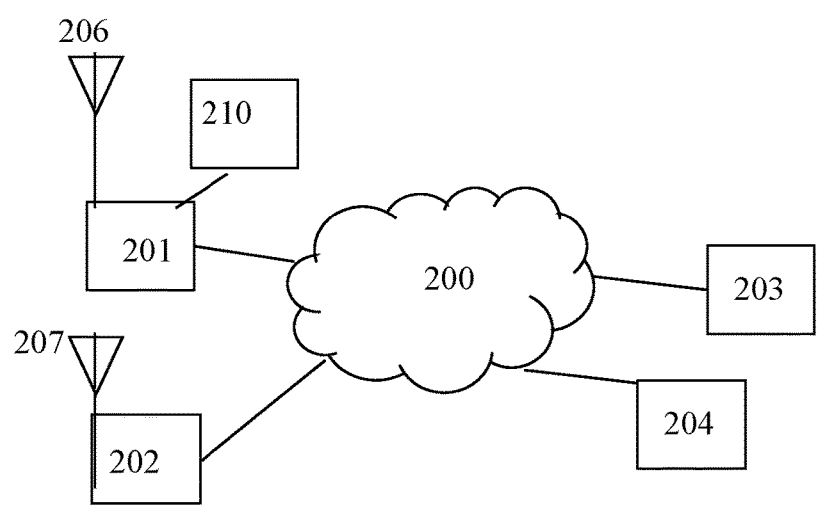
FIG. 2 illustrates a system with a network in accordance with various aspects of the present invention.

FIG. 2 illustrates a network of devices with a wireless and mobile opener 201 and a device, object or structure 202. Device 201 and object/device/structure 202 all have the required circuitry, memory and processing to exchange data with a network 200 which is preferably a wide-area network 200 such as the Internet, which also connects to servers 203 and 204, also having required communication circuitry, processors and memory. Furthermore, device 201 via antenna 206 connected to internal communication circuitry is enabled to communicate directly wirelessly via antenna 207 and communication circuitry with a processor in 202.

One purpose of opener 201 is to provide signals to 202 that lead to opening or activating of a mechanism in 202. In order to prevent a malfeasant to surreptitiously activate 202 the device 201 has to be validated. In accordance with one embodiment of the present invention, device 201 generates or collects unique or very hard to predict data during a period of time that is shared with a server 203 via the wide-area network 200 and shared with 202. When 201 is activated to open or activate 202 the generated or collected data of 201 is transmitted to 202 which has already received that data from the server 203. By comparing the validating data transmitted via 206 to 207 with the data received by 202 from 203, the processor on 202 can validate that 201 is an authorized opener.

The use of unique and basically unpredictable codes has been explained in U.S. Pat. No. 9,100,166 issued on Aug. 4, 2015, which is incorporated herein by reference.

In the present document it is explained how unique and unpredictable data is assembled by the opening device. It is also explained how the unique data is applied to validate the device.

Unique data is unpredictable data or random data. However, in order for a first device such as device 9 to validate device 10, in some way the validating data has to be shared, which may form a security risk. It must be assumed that in the most persistent cases of breaching security all signals may be stolen and broken. In a less stringent case one may assume that signal stealing only takes place around the location of 9 and that only the wireless signals are stolen or potentially interrupted. In an even less stringent embodiment it is assumed that only local wireless exchange signals between local antennas 6 and 7 are stolen or intercepted.

In one embodiment of the present invention the opener 10 contains sensors 31 which may contain position sensitive sensors, which may include a GPS sensor, a digital compass, one or more accelerometers or gyroscopes, a temperature sensor, a light sensor or any other sensor that measures a changing physical phenomenon. Preferably, the sensor measures a phenomenon that changes often, even during a short period of time. A digital compass on a wrist band achieves that quite easily. Accelerometers on a moving body part achieve the same. One may also use sensors in a smartphone. However, if the smartphone is placed on a desk, no or little movement takes place. In that case detection of a sound or light level may be applied. Preferably, sensor data from sensor(s) 31 is taken by processor 3 on certain times and stored in memory or storage device 32 in the opener.

In one embodiment of the present invention sensors are embedded in a separately worn device 210 which may be a smart watch which is connected to device 201, in a wired or wireless manner. When 201 is a smartphone, which may be stolen then absence of 210 will fail 201 to receive the required sensor data generated by 210.

In a further embodiment of the present invention, data is obtained from sensors and stored in 32, for instance at least one every second, or at least once within every 10 seconds, or at least once within every 30 seconds, or at least once within every minute, or at least once within every 10 minutes, or at least once within every 30 minutes. Preferably during a day between at least 10 and a 100 measurements are taken during a period of 1 hour. The rate of taking measurements in one embodiment of the present invention depends on the interval between which the opener 10 has to be validated.

If the interval is short, the rate of measurements should be higher than if the opener is used only once a day. The size of storage devices, which may be optical and magnetic storage, and nowadays is often electronic in nature such as NAND or NOR memories, is such that easily thousands measurements can be stored.

In one embodiment of the present invention, the data generated by the sensor on the opener or directly connected to the opener is also shared with a memory of the processor in device 202 that is to be activated or opened. The data may be sent directly shared with 202 or is sent to 202 by a server which received the data from the opener. The data is preferably coded or encrypted. However, there is no guarantee that the data is not stolen or decrypted. In one embodiment of the present invention the data is treated as being in clear text format.

The purpose of the sensor data is for 202 to validate device 201. That is: device 201 has collected or generated unique data that is impossible to predict. Device 202 also receives that data almost immediately or shortly after it has been generated. Preferably the majority of that data has been generated away from the immediate area around 202, so there is no device posted close to 202 that could have received or stolen or modified that data. Once 201 gets close, for instance within visible range, of 202, or within preferably within 25 meter, more preferably within 10 meters, even more preferably within 5 meters and most preferably within 2 meters range of 202 and exchange of signals and data is started, for instance by activating 201 for instance by pushing a button on 201, but other activations are contemplated.

One exchange of data includes data based on the sensor data. At that time both 201 and 202 have direct access to sensor data. In one embodiment of the present invention part or all of the sensor data is exchanged between 201 and 202. This can take place by 201 transmitting data to 202 over the local wireless connection to 202. In that case 202 makes a comparison between the received data based on sensor data and data stored on 202. If the data are identical then 201 is validated. Validation can also take place in the reverse direction, by 202 transmitting the validation data to 201. Device 201 then responds by transmitting sensor based data in return to 202. Clearly, one would prefer that in that case the exchanged data is not merely a series of consecutively generated sensor data. In fact, one has to assume, under the condition of stealing and decrypting data that a malfeasant has access to the same data, though in standard conditions that to be unlikely. In fact, what is desired is to exchange data for validation that is unpredictable, but even if it were predictable, it is modified in such a way that the modification is unpredictable.

In accordance with an embodiment of the present invention a series of consecutive sensor data is transmitted, preferably through a wide area connection from the opener or a sensor that is connected to the opener. For instance at least 100, or at least 500 or at least 1000 data elements, each representing a sensor measurement, are stored in the opener and are sent to device 202. Thus both devices 201 and 202 have a significant amount of data elements. The data elements preferably have a random character, as they are taken from the sensor at different moments wherein the sensor data have no clear correlation due to the time that has passed. Memories in 201 and 202 store the data in the same order, or at least in an order that is known. For instance the order in device 202 may be offset compared to the way it is stored in device 201.

Figure 3:
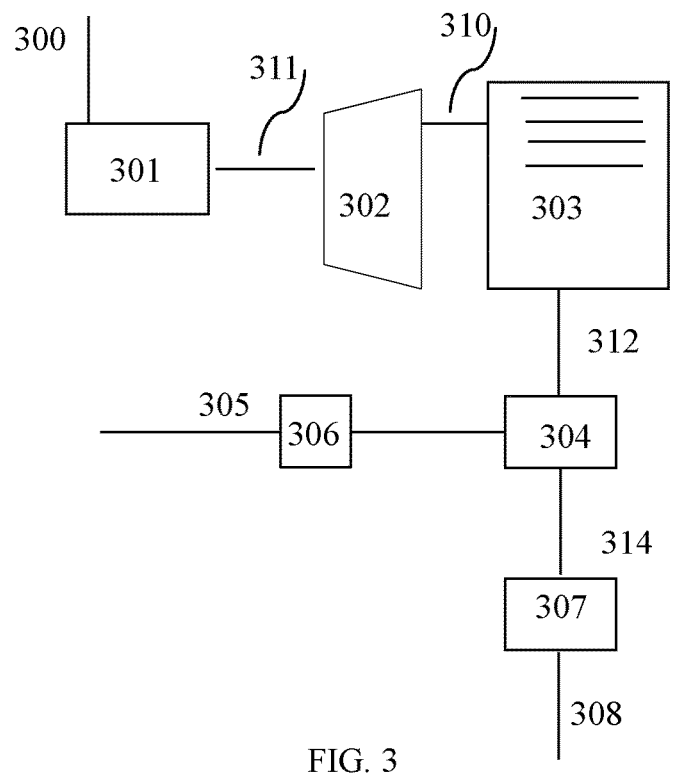
FIG. 3 illustrates a system for modifying data in accordance with various aspects of the present invention.
Figure 4:
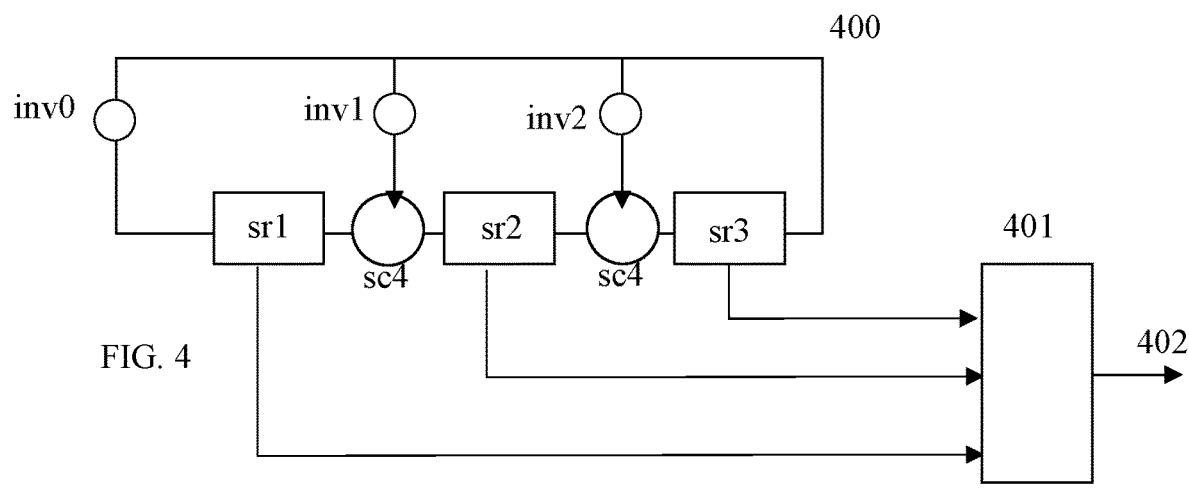
FIG. 4 illustrates a system for generating data in accordance with various aspects of the present invention.

In a first embodiment of the present invention the memories of 201 and 202 store the same data in the same order. For validation data that is derived from the stored data is calculated in each device and then is exchanged and compared to validate the opener. One illustrative embodiment is schematically illustrated in FIGS. 3 and 4. The configurations as shown in FIGS. 3 and 4 are both implemented in devices 201 and 202 so that they generate the same results. A memory 303 contains the sensor data in an addressable memory in similar order. Data is arranged in datalines, each dataline enabled to be read individually based on activating a corresponding address line. A data element is selected by activating an address line 310. The address line 310 is activated in addressing circuit 302 from data on input 311 which is an output line from a data generator 301. The data generator 301 is preferably an autonomous generator, like a shift register with feedback sequence generator. In a further embodiment a dataline 300 provides data that initiates the generator, for instance from a memory that has different initial data settings to provide.

Accordingly, the content of a specific dataline in memory 303 is provided on an output 312, which may be a series of output lines each representing a bit line in the data. FIG. 4 illustrates one possible sequence generator 400, which is a 4-state or 4-valued sequence generator which is implemented for instance on a processor which may be a binary processor. The generator is a 4-state or 4-valued shift register with feedback in Galois configuration. It has 3 4-valued or 4-state shift register elements [sr1 sr2 sr3] connected with a 4-state function sc4 which is in this illustrative case an addition over GF(4). The feedback taps have 4-state inverters inv0, inv1 and inv2 respectively, which are all multipliers over GF(4). The inverters are selected as inv0=[0 3 1 2], inv1=[0 2 3 1] and inv2=[0 0 0 0]. Accordingly, inv2 is an open connection if implemented in individual discrete hardware elements. The sequence generator is a maximum length sequence generator. This means that the generator generates 63 different states of [sr1 sr2 sr3] before it repeats itself. Accordingly, each of the 63 contents can be translated in one of 63 unique numbers. The sequence generator in one embodiment of the present invention is implemented on a processor of which the Matlab code is shown as a screenshot 500 in FIG. 5. FIG. 6 in table 600 which is a screenshot generated by the Matlab program of FIG. 5.

In one embodiment of the present invention the data 312 is modified by a device 304 with data stored in a memory 306 that is activated by a signal on input 305. The modification may be a simple addition with a constant factor that changes with each activation signal 305. The modification may be a multiplication with a constant from 306 that changes with each new data signal 312. Or 304 may be a modification in accordance with an operation over $GF(2^p)$. For instance, one can store and apply data in and from 303 in a truncated form. For instance, a sensor may generate 32 bit data. One may truncate the sensor data to for instance 8 bits, which may be 8 most significant bits or 8 least significant bits if one assumes that the least significant bits change the most. An 8 bits word then represents a 256-state word. Device 394 may implement a 256 state inverter or switching function. Based on signal 305 device 304 may load for each new dataline on 312 a new 256 inverter from 306 or provides a new constant to modify 312 against. In a further embodiment of the present invention only a limited number of datalines are activated. For instance, 303 may contain at least 63 datalines, but only the first 25 contents of the shift register is used. The content of the shift register is provided to device 401 that changes the 4-state content into an activation signal 402 which may be a decimal signal that determines a row in a memory and is used as signal 310.

The modified signal 314 is provided to an accumulator or device with an accumulating function that determines an output 308, which is the validation signature. The devices 201 and 202 should generate the same validation signature. Accordingly, the opener 201 sends a validation signature 308 to device 202 which has generated the same signature and thus the opener is validated. In a preferred embodiment the content 307 is reset to an initial value before calculating a new validation signature. Preferably, a new initial value for 307 is obtained each time a new validation signature is calculated. The instructions for data modification, data selection, change of selection and modification are all stored internally in the devices 201 and 202. In one embodiment of the present invention, these change instruction may be limited to a short set of instruction, like a 100 or a 1000 or a 10,000 changes. After all instructions have been applied, the first change instruction is applied again. Assuming that 10 openings of a car or a garage door per day is quite a large number, the availability of 10,000 unique changes would ensure that the changes would be applied again after 1000 days or after more than 2.5 years. For most cases that is a sufficient number.

In one embodiment of the present invention more changes may be implemented. For instance, it is not necessary that reversible operations have to be applied. The selection of datalines can be performed with not maximum length sequence generators. This may lead to repeated use of the same dataline. However, this may be combined with different changes such as inverters in device 304. However, if the selection and changing instructions are unpredictable then the validation mechanism is unpredictable and serves its purpose.

One hard requirement is that generation of the validation signature in 201 and 202 lead to comparable results. There are different ways to achieve synchronization. One is by synchronization to external signals provided by for instance an atomic clock signal or from GPS signals. In one embodiment of the present invention it is not required to have high accuracy synchronization. For instance a certain period is observed for unlocking. In that case both 201 and 202 apply clocks that run with an accuracy within that period. In one embodiment of the present invention the clock in at least opener 201 but also in 202 runs in an autonomous manner. Only after the opening or activation has taken place, is a clock synchronization possible. Highly accurate clocks that work autonomously, at least for a certain period such as 12-24 hours or longer are known and are said to run in "airplane mode." Such highly accurate clock circuits are described in U.S. Pat. No. 7,542,445 to Berggren on Jun. 2, 2009 which is incorporated herein by reference. Furthermore, highly accurate temperature compensated crystal oscillator (TCXO) based chips exist that provide clocks with an accuracy within 0.3 seconds per day. For instance the DS3232 circuit marketed by Maxim Integrated of San Jose, Calif. provides a clock with an accuracy of 2 ppm, the specification of which is incorporated herein by reference. Clock circuits with an accuracy better than 1 ppm and up to 1 ppb are also known.

The accuracy of a clock circuit can be improved by using an oven controlled crystal oscillator or even an Rubidium Oscillator clock as marketed by IQD Frequency Products Inc, of San Jose, Calif. 95131. These circuits achieve an accuracy that is better than 1 ppb, or accurate within a second. This means that two devices with high precision clock circuits that work autonomously are synchronized within a second of each other without the need for synchronization. With less accurate circuits, the clocks are still synchronized within several seconds, if synchronization based on an external radio signal is performed once every week.

In accordance with one or more aspects of the present invention as many operations as possible are performed autonomously inside the devices without the need for external signals. If external signals are required, such as the sensor data, these signals are preferably transmitted through a transmission signal that is separate from the channel that provided opening or validation signals. In general the data signals from the sensors are determined and transmitted at different times and locations than the opening action by the opener. These signals are transmitted over the wide-area-network and would be much more difficult to capture than signals generated at a location close to the device or structure that has to be opened by a direct (non-wide area) channel.

Figure 7:
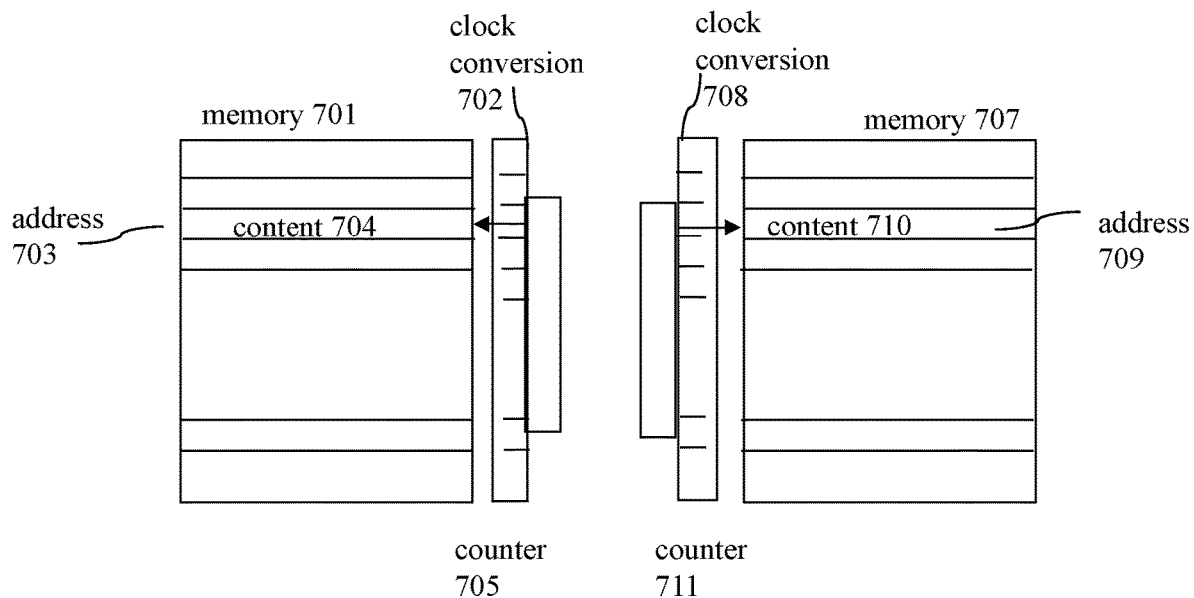
FIG. 7 illustrates synchronized memories in accordance with various aspects of the present invention.

In accordance with an aspect of the present invention, both devices 201 and 202 have a series of identical data that has to be processed to generate for each device to create the same result or at least comparable result as to serve as a validation signature. An easy comparison is when both 201 and 202 generate the same number. However, the numbers may also be modified so they are for instance a complement in an radix-k system. This makes it a little bit harder to use stolen information. No matter what the configuration, the processors in 201 and 202 are required to apply the same or complementary modification configurations. FIG. 7 illustrates an embodiment for the present invention for identification and retrieving of the required modification configuration. Device 201 has an addressable memory 701 and a clock circuit connected to an address conversion circuit 702. Device 202 has an addressable memory 707 and a clock circuit connected to an address conversion circuit 708. The clock circuit includes a calendar conversion that sets year, date, time. When a conversion request is initiated for instance by activating the opener 201, the clock conversion circuits converses the time from the clock circuit into a memory address. For instance, each day has 100 configurations defined in an order. The first activation of the opener 201 at a specific day initiates a first address. Counters 705 and 711 store the number of activations during the day. After each activation the counter is increased with a number, preferably with 1. This determines an address 703 and 709, corresponding with contents 704 and 710 which point to memory contents 704 and 710, respectively. A new day resets the counter to 1. By applying a limited period for calculating an address, loss of synchronization is minimized. Different periods for address determination can be used. One can use shorter periods or longer periods. One issue is to determine a sufficient number of configurations during a period. In a further embodiment of the present invention a period has a single configuration that is used for each opening and that changes to a new configuration is a next period. Preferably all configurations are unique.

In one embodiment of the present invention, a new modification configuration should be available each second. For a year this requires about 32 million data lines. Assuming that each configuration requires 10 bytes. One GByte of memory then provides enough configurations for about 3 years.

It is assumed that for the selection of data elements in an illustrative example at least 1024 data elements are available from which at least 10 data elements have to be selected. This requires that the LFSR in binary form has 10 shift register elements. This requires at least 9 bits to indicate the active tap positions. In 4-state LFSRs this requires 5 4-state shift register elements and active taps being indicated by an integer that identifies one of 4 possible values in the case of inverters that are multipliers over GF(4). One may also select from 24 reversible 4-state inverters or from all $4^4$ 4-state inverters.

In the 8-state case, the LFSR should have at least 3 8-state shift register elements, which can address 512 data elements. There are 8! 8-state reversible inverters from which one can select a tap (inverter) value. And so on. There is no theoretical limit to the n-state logic from which the LFSR elements can be selected. However, the higher n, the higher the memory storage requirements. One should also store locally the switching functions and inverters from which an active function is selected.

The storage format in binary form may be {[2]=logic| [10]=number of shift register elements|[1 1 0 1 0 0 1 0 1 1 1]=feedback|[722]=initial state of LFSR|[2] [4] [9] [2] [3] [8] [5] [1] [1]=decimal multipliers}. The number '2' indicates a binary LFSR, followed by number of shift register elements, followed by position of the feedback taps (there are 11 taps, including first and last one); followed by the decimal representation of the initial state of the shift register; followed by the inverters or decimal multipliers for each calculation before accumulating.

In the 4-state case, the representation can be: {[4]|[5]|[2 0 3 1 1]|[722]|[2]1 [2] [4] [9] [2] [3] [8] [5] [1] [1]}. This is comparable to the binary case. There are many other different ways to modify the data. It should be apparent that the modifying configuration is determined by the selected state of the modification. Based on the selected conditions, all parameters can be generated automatically with the use of a random number generator. Just the number of decimal multipliers provides sufficient variation. The order of storage in memory 701 and 707 of the modification configurations can be further randomized by using an 8-state maximum length LFSR of 10 shift register elements, wherein the address of an originally determined kth configuration is stored in the address or location in memory 701 or 707 that is determined by the kth content of the 8-state LFSR.

In one embodiment of the present invention clock information received from a central clock may be used to determine the active modification configuration. However, signal jamming is a known way of malfeasance and thus using real-time external clock information is a possible but now preferred method to be used for determining a modification configuration.

Figure 8:
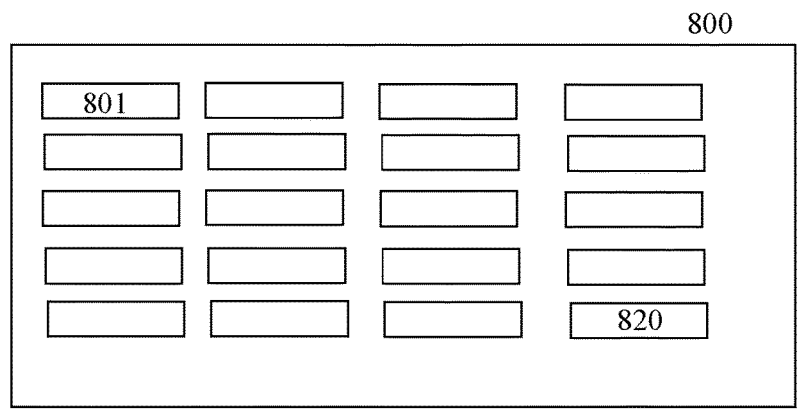
FIG. 8 illustrates a screenshot of a webpage that provides different numbers that are updated in accordance with various aspects of the present invention.

In some cases one could target the wearer of the sensor to steal information. Without the modification configuration that information is not very useful. Still, such a situation is undesirable. In a further embodiment of the present invention, publicly available and transmitted data is used and for instance pulled from a website. Such information may be temperature data or wind direction/force data that is consistently being updated. Using the clocks, both devices 201 and 202 are instructed to download temperature and/or other environmental data from the Internet. It is highly unlikely that such data can be tampered with. However, weather stations are known to be offline for considerable amounts of time. In accordance with a further embodiment of the present invention a web site is maintained by a service provider who posts one or more random data elements on a website which is harvested by devices 201 and 202 on a predetermined schedule. This is illustrated in FIG. 8 with a screenshot 800 of such a website. The website 800 in this illustrative example has 20 fields, of which a first field 801 and a last field 820 are illustrated. Each field displays a random set of symbols, which is updated at least each second or at least 5 seconds or at least each 10 seconds. For high accuracy devices the website has at least one field that is updated 10 times per second with different random numbers.

The devices 201 and 202 are provided with the random numbers which are pulled off from the website by a server that transmits the random numbers to the devices 201 and 202 to create a validation signature in accordance with a selection/modification scheme.

At this stage, when an opening device is activated a validation signature is generated both at 201 and 202. For instance, 201 may send an alert to 202 indicating that a validation is needed. Or the transmitted signal itself is the validation signature which after reception initiates the calculation of the validation signature at the receiving device. The signature is used in one embodiment of the present invention to have the device 202 validate the opener 201. After sending the validation signature, the opener 201 transmits the activation signals, for instance as described in U.S. Pat. No. 9,100,166 to Lablans issued on Aug. 4, 2015 which is incorporated herein by reference. Accordingly, even if the opening device was stolen, if it does not have access to the sensor data, device 202 cannot be activated as the stolen device will not be validated.

The above embodiments of the present invention are particularly useful when device 201 is near device, within sight, of device 202. Device 202 is for instance part of a vehicle or a garage or other structure that has to be opened.

Other devices that have to be opened or activated that are within sight are ATM machines or are valuable remote accounts such as remote on-line bank accounts or remote accounts with purchasing power such as Amazon where from expensive article can be purchased on-line. Validation of account operators on-line is important to prevent fraud. Especially man-in-the middle (MITM) fraud is nowadays a serious threat in on-line bank or account transactions. In MITM fraud, as a result of spoofing or other actions a malfeasant or a malfeasant server impersonates a valid server to a client device and impersonates the valid server to the client device.

Figure 9:
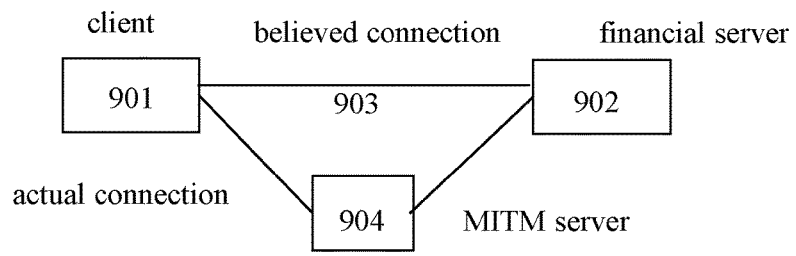
FIG. 9 illustrates a configuration of a Man-in-the-Middle Attack.

The MITM configuration is shown in diagram in FIG. 9 to explain the concept. A client device 901 attempts to contact a server, generally a server with financial transactions 902, via a connection 903. However, the user is not in control of establishing 903, which is generally a series of connections. A malfeasant MITM server 904 succeeds in establishing contact with 901 and to connect with 902 also. Without further ways of verification and validation, it would appear to 901 that it is connected directly to 902. By transferring the correct validation data between 901 and 902 via 904, it appears that a valid and safe connection has been established. MITM server 904 exchanges all correct validation data but changes the transactions towards 902 and 901. For instance 901 provides an instruction to transfer funds Amount1 to an account Account1. MITM server 904 intercepts the instruction and modifies it to a transfer of Amount2 to an account Account2. If sufficient funds are available then server 902 confirms the transaction and executes it. The confirmation is also intercepted by 904 and is modified into a confirmation of the original transaction.

In accordance with various aspects of the present invention several approaches are provided to at least stop the execution of a MITM attack.

Figure 10:
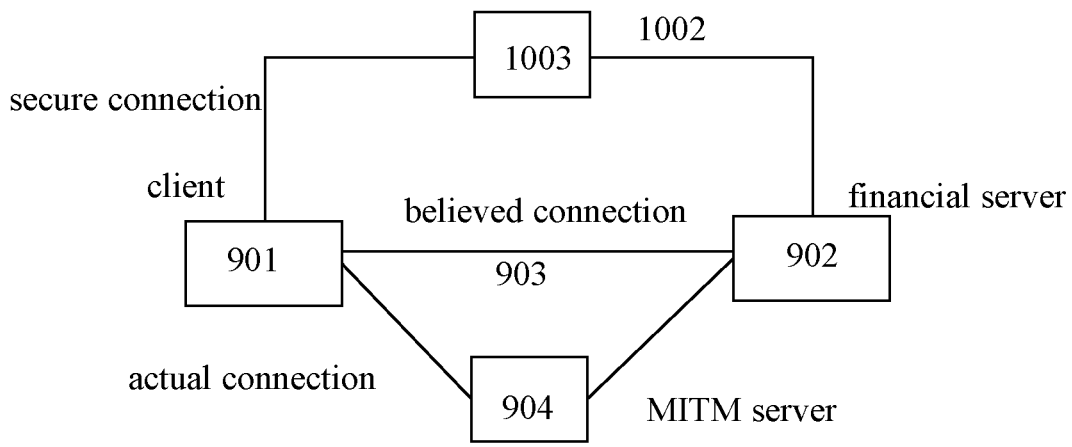
FIGS. 10 and 11 illustrate configurations that address a man-in-the-middle attack in accordance with various aspects of the present invention.
Figure 11:
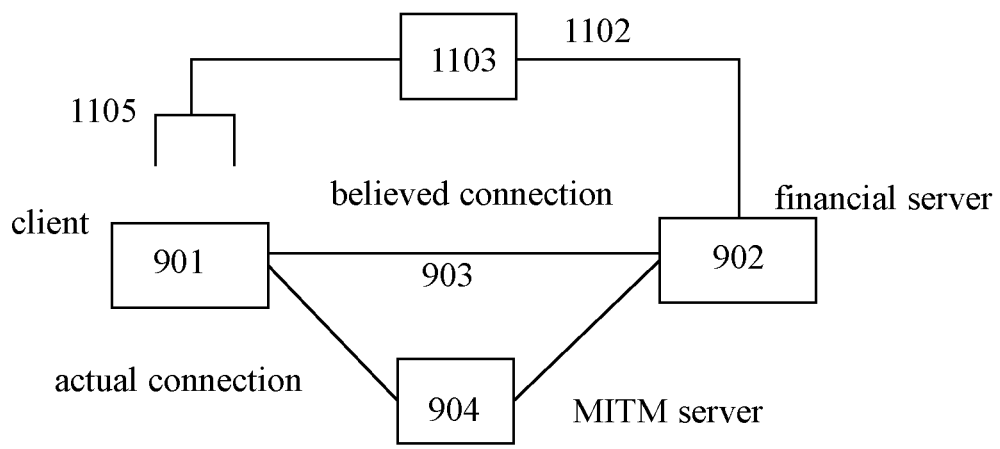

FIG. 10 illustrates a first configuration to address an MITM attack. It may be assumed that in an MITM attack one cannot rely on any exchange of validation or authentication data. One solution is for a user on 901 to independently initiate a secure connection via a secure connection 1002 to server 902. The secure connection is in one embodiment established through a secure name server (DNS server) 1003. One cannot rely on any data provided on a website under control of 904. Accordingly, the URL or address should be activated from a secure application on 901, as it must be assumed that configuration data on the device 901 also has been compromised. Establishing a secure DNS query is described in U.S. Pat. No. 8,935,748 issued on Jan. 13, 2015 to Statia et al. which is incorporated herein by reference.

After establishing the secure connection an extra window opens on 901 that shows which activities or transactions are submitted to 902. This allows a user to check if there are inconsistencies in the submitted and received transactions. Unfortunately, this extra layer of security requires a level of vigilance of a user that may be difficult to maintain over time. In one embodiment of the present invention device 901 is programmed to detect differences between submitted and received transactions.

In one embodiment of the present invention a transaction initiated by 901 in an MITM attack generates as a response the establishment of a secure connection 1102 via a server 1103 to a different device 1105 that is under control of the user of 901. For instance device 901 is a computer on a wired Internet connection. Device 1105 is a smartphone connected to 902 through a fundamentally different channel, for instance a dial-up cellphone network. Preferably 1105 is not on the same network as 901 through for instance WiFi. Server 902 provides feedback to both 901 and 1105. Data from 902 that is modified by MITM server 904 to 901 can be detected on 1105.

The experience appears to be that all secondary steps to prevent MITM attacks are somewhat bothersome and are often ignored to the detriment of security. An effective way to prevent or at least stop a MITM attack is to recognize the attack and to alert the user of discrepancies in transactions.

It was already observed that validation or authentication data is merely transmitted during a MITM attack and does not provide a recognition of an attack. One way to recognize a MITM attack is by leveraging the difference in data. That is: 901 initiates a first transaction that is modified by the MITM server into a different transaction. When 902 confirms the different transaction to 901, it is modified by 904 into a confirmation of the first transaction, etc. In accordance with an aspect of the present invention methods and devices are provided that allows a sender device to detect changes wherein a MIMT is unable to modify the data adequately to prevent detections.

It is assumed that a MITM server can intercept and change any data between 901 and 902 at will. The trick is then to provide data to 904 in such a manner that 904 cannot reasonably detect nor can 904 adequately change data in such a manner that it prevents detection of change.

In accordance with an aspect of the present invention data related to a transaction is provided with a hash output generated by a hash function based on input data. In accordance with an aspect of the present invention each message related to a transaction is provided with a hash value generated by a different hash function. In particular instructions received by the server 902 are returned for verification to 901 but hashed with a different hash function. Accordingly, data sent from 901 to 902 is hashed by a first hash function and returned by 902 to 901 with a hash created by a different hash function. The generated hash values are thus different even if the same input data is applied.

A MITM server that has no access to the hash function is not able to change the data adequately without ruining the correct hash value. Inconsistencies will be detected immediately at 901 and/or 902 and progress of the transactions will be stopped before damage is done.

There are many different hash functions, as for instance listed on website https://en.wikipedia.org/wiki/List_of_hash_functions, which is incorporated herein by reference. There are several criteria for determining if a hash function is "a good function." One criterion is its resistance against an attack. Under the conditions of the MITM attack it is sufficient for a hash function to be resistant against an attack that lasts a short time, about 1 minute or shorter. If a message or confirmation message is not acknowledged with a counter value within a certain period, 1 minute or less for instance, the transactions automatically time out and the NITM attack becomes moot. Furthermore, in accordance with an aspect of the present invention each hash function is only used once. In general that condition causes too little data, merely a single hash value, to try to reconstruct the hash function. To increase security different hash functions are concatenated.

In accordance with an aspect of the present invention a series of at least 10,000 and more preferably over 100,000 unique configurations for a hash value coder are stored in synchronized memories in a client and a server device. Even more preferably, the number of configurations is greater than 1 million and yet more preferably the number of configurations is greater than 10 million and even more preferably greater than 100 million. The use of configurations is synchronized. After using a configuration once (either for transmission or checking a hash value) the configuration is disabled, for instance by overwriting the memory address for that configuration with all zeros or all ones, which indicates an invalid configuration. In accordance with an aspect of the present invention disabling means to disable its use for a period of preferably one year, more preferably for at least two years and most preferably for at least 3 years. The list of configurations in one embodiment of the present invention contains at least 1 million sets of configurations each set of configurations being associated with a unique identifier. In accordance with an aspect of the present invention a used configuration or set of configurations as disclosed herein is placed at the bottom of an ordered list of configurations or sets of configurations of at least 1 million long and preferably at least 10 million long.

A configuration as stored has one or more or all of the following parameters [(n=the value of the logic); (the length of the shift register); (the taps and the inverters in the taps in the coder); (the initial value of the shift register); (a referral to the scrambling function); (the referrals to the relevant feedback functions); (the number of cycles required)]. In one embodiment of the present invention the truth tables of switching functions and inverters are stored in memory and provided with an identifier. The functions and inverters in the stored configurations are determined by these identifiers and are retrieved for execution based on the stored configuration.

For illustrative purposes shift register based hash functions are used. It should be clear that any modifiable and reasonably secure hash function can be used. This may include for instance Feistel or other hashing or crypto networks, elliptic curve cryptography, block ciphers, SHA type hashes. In accordance with an aspect of an embodiment of the present invention a CRC value is calculated of data that is supposed to be transferred from a client to a server to perform a financially significant transaction. The server recalculates the CRC value and confirms the transaction to the client providing it with a CRC value that is recalculated at the client. Each transaction activates a unique CRC calculation.

Figure 12:
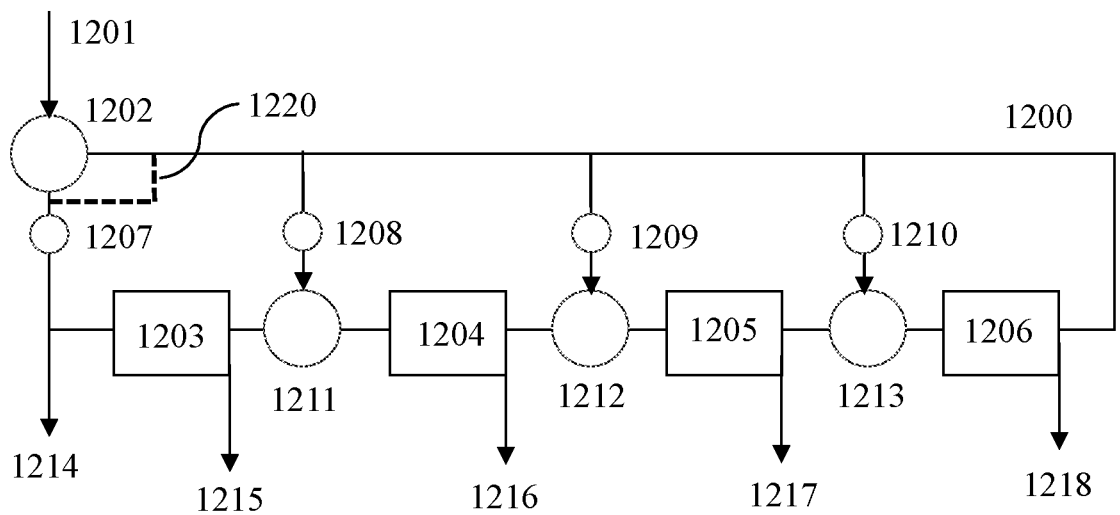

FIG. 12 illustrates a scrambler 1200 of 4 shift register elements 1203, 1204, 1305 and 1206 in Galois configuration. An extra shift register element 1302 is included in an embodiment illustrated in FIG. 13. The shift register elements each can hold and shift an n-state or n-valued symbol represented by a signal. The scrambler includes n-state or n-valued switching functions 1202 1211, 1212 and 1213. For simplicity one may use the same n-valued switching function, for instance an n-valued addition over GF(n) with n greater than or equal to 2. Device 1200 is a hash value generator and reversibility of the scrambler is not needed or desired. Preferably function 1202 is not a reversible function. Each feedback tap contains an n-state or n-valued inverter 1207, 1208, 1209 and 1210. The inverter 1301 in FIG. 13 originally is a unity inverter and is a straight through connection. The input message is provided on input 1201 as n-valued symbols. A scrambled message can be outputted on 1214, but preferably not. The final state of the scrambler after scrambling is outputted on outputs 1215, 1216, 1217 and 1218. For practical reasons one may want to have a scrambler with 10-20 shift register elements or even longer. The whole scrambler works under a clock signal that assures that the contents of the shift register elements are shifted at the right times. The number of clock pulses determines how many cycles the scrambler is operated.

The start of the scrambler is an initial shift register value that is kept secret to the outside world. The length of the hash value (the content of the shift register) is not limited by the size or length of a message. The scrambler may be set to operate on maximal 100 characters. In some cases the message may be less than 100 characters. In one embodiment of the present invention the scrambler is configured to run in autonomous mode after all message characters are entered. This is illustrated as connection 1202 which is activated after all message characters have been entered. The function 1202 is then shorted and does not longer play an active role and the scrambler rubs as an autonomous sequence generator that changes its content of the shift register. In the alternative an internal set of secrets characters is input on 1201. Both embodiments mean that an external observer has no idea what the actual run-time and/or input message is to the scrambler or coder.

Figures 13, 14:
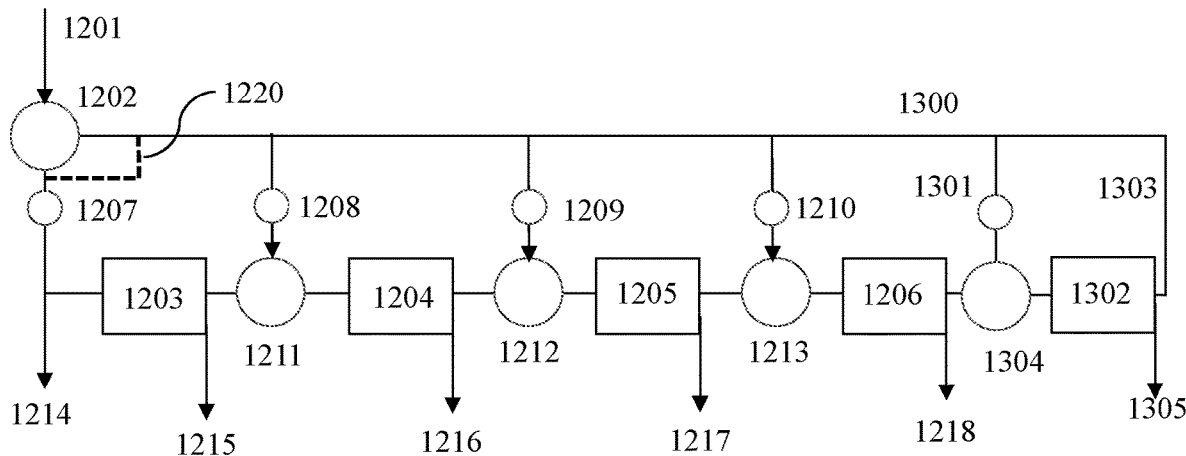

In a further embodiment of the present invention, the configuration of the scrambler/coder is modified at least once during the generation of the content of the shift register. This modification includes at least one of the following: 1) a modification of one or more of the inverters in feedback taps; 2) a modification of the scrambling function 1202; 3) a modification of at least one of the feedback functions and 4) a change in the length of the shift register. The change in shift register length is illustrated in FIG. 13. By adding tap 1303 from additional element 1302, which may be accompanied by inserting 1301 as n-valued inverter, the shift register is effectively lengthened. Also added is feedback function 1304. The content of 1302 is outputted on 1305. Additional shift register stages can be added. Other modifications, including changing the value of n to a higher value or even lower value are also contemplated.

A shift register based coder, including scramblers, sequence generators block coder CRC coders and the like are often considered or at least treated as static devices. One reason for that may be that shift registers and feedback functions are often implemented or built in fixed components. In one embodiment of the present invention, the shift register based devices are realized in programmable processors with memory. The performance of processor based shift register coders is indistinguishable from other hardware based realizations. The signals generated by the processor are identical to any other hardware realization. However, the use of processors facilitates the change of a configuration in midstream.

The herein provided methods for calculating the hash values related to a message are very flexible, easy to implement with an extremely large number of possible solutions which make attacks at least very time consuming and unlikely to be able to be successful in the short period of time before the system times out. One aspect of the present invention requires that the content of a received message related to a transaction is confirmed by the financial server at least with a hash value that is recalculated by the client device. Not matching of calculated hash values leads to stopping transactions and/or opening a new secure channel for communication that allows further validation of a client and/or a transactional server such as a financial server. It is deemed close to impossible for a MITM server to crack and reconstruct the hash function fast enough to correctly calculate the hash value. Because the hash function changes at every stage of communication, it is not possible for a MITM server to adjust quickly enough. A confirmation hash from a server to a client will be different, no matter if it relates to a correct or to a falsified message. Furthermore, continued interception of messages does not teach a malfeasant anything as every message invokes a new hash function.

A set of 20 hash characters corresponding to a shift register of 20 shift register elements by itself enables $n^{20}$ possible initial starting positions of the scrambler or coder. With n=4 it has already become impossible to reconstruct the hash function in a reasonable time. With the possible variations in configurations, cycle durations and so on, there is no reasonable strategy that enables a malfeasant to reconstruct the function in a timely manner. Long term security is not an objective with this. Security for 30 minutes is very good and is easily achieved with the aspects as provided above.

Synchronization of the client and the transactional (financial) server can be achieved in different ways: time based or date based synchronization is one possible way. An initial exchange of a status of the configuration tables, by setting a counter for instance, is also possible. Client and server may exchange a code that sets a start position. Each time a configuration is used, it is removed for use from the configurations. Furthermore, the tables, configurations and coders should preferably be operated as separate non-accessible devices. That is: there should be no way to dump the content of the memory or to modify the memory or hash program. Preferably a hard physical exchange of hardware should be required to install or exchange the hash function and should preferably operate separate from a main memory and processor in a client and server. Initial settings and configurations are established, programmed and loaded into memory at a secure location and then distributed to client operators.

FIG. 14 shows a screen shot 1400 of a Matlab program that implements a 4-state or 4-valued hash function of a 4-state or 4-valued shift register of 4 elements with 4 4-state or 4-valued inverters and at least 2 4-state switching functions. Also 4 different initial shift register contents are provided. The number of variations is much, much larger and the herein provided values are merely provided to illustrate the process of selecting different configurations. The selection of configurations is illustrated in 1400. FIG. 15 in 1500 illustrates a screenshot of a program listing of the execution of a Galois configuration of a scrambler. For each example the identical message [1 2 3 4 1 2 3 4 1 2 3 4 1 2 3 4 1 2 3 4] is used. For illustrated purposes the scrambler switches to an autonomous sequence generation mode after all characters are entered. As a reminder: 20 stage 4-state shift register elements provides $4^{20}$ possible initial states. There are about 4 billion different 4-state switching functions. One may select 1000 different functions from which can be selected. In a 20-state shift register the feedback functions must be determined for 20 positions, which provides a variation of $1000^{24}$. There are $4^4$ different 4 state inverters. A 20 stage shift register must select inverters in 20 positions. These numbers guarantee that no short term crack will be achieved. The situation becomes exponentially more difficult for a malfeasant when one switches from a 4-state or 4-valued coder to an 8-state valued or 8-valued coder or higher such as a 256-state or valued coder.

Figures 16, 17:
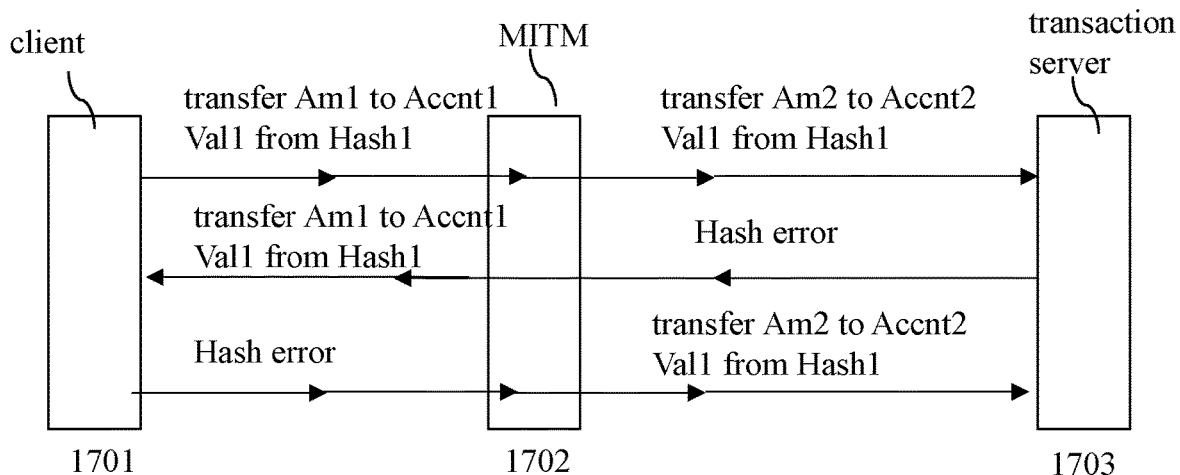
FIG. 16 illustrates hash values generated in accordance with various aspects of the present invention.
FIG. 17 illustrates a transaction scenario in accordance with various aspects of the present invention.

FIG. 16 in table 1600 illustrates the generated hash function. The left side shows the hash value when the coder stops after processing all input symbols. The right side of 1600 shows the result when the coder continues autonomously for a preset number of total scrambling cycles.

The hash methods as provided herein are used in a system wherein server 902 in FIG. 9 is a server that interacts for or on behalf of a bank and wherein client 901 transfers money from an account at the bank to another account either with the bank or at another bank. In another embodiment server 902 performs a transaction related to an account on the server, for instance related to delivery of a product or of a server.

In a further embodiment of the present invention the coder or scrambler as illustrated in FIG. 12 uses a reversible function 1202, thus creating a streaming scrambler that produces a scrambled message on 1214 which can be descrambled. In accordance with an aspect of the present invention the different configurations as provided above are applied to produce scrambled messages, each message is scrambled in a unique way and for each message a new configuration is applied. The inventor has previously explained how a corresponding descrambler matches a scrambler. If the scrambler configuration is known then the descrambler is also known. In case of a Galois configuration, this requires knowledge of the initial state of the scrambler. Adequate scrambling in accordance with aspects as provided herein makes MITM attacks moot, as an attacker would not be able to modify a scrambled message.

There are many scenarios that illustrate aspects of the present invention. An illustrative scenario is provided in FIG. 17. FIG. 17 shows a client 1701 to instruct a transaction server 1703 to transfer an amount Am1 to an account Accnt1. The instruction message has a hash value Val1 generated from the message by a hash function Hash1. A Man-in-the-Middle (MITM) server 1702 has intercepted the message and changes it to transfer an amount Am2 to an account Accnt2. The MITM server can strip the hash value, maintain the old value Val1 or make up a new value. However, 1702 has no access to the proper hash function. Accordingly, the server 1703 recalculates the hash value and determines that there is a Hash error and sends an error message to the client 1701. The transaction server may also stop the session there and then, based on the assumption that a fraudulent transaction has been submitted.

Assuming that an error message has been generated by 1703, server 1702 intercepts it and confirms that Am1 to Accnt1 is supposed to be executed. MITM 1702 may attach Val1 from function Hash1. However, in accordance with an aspect of the present invention each message has its unique hash function and Val1 from Hash1 is not valid, even if the message is identical. An error message will be generated by 1701. Even though the messages may be intercepted, none of the modified transactions will be validated or authorized because 1702 is unable to generate correct hash values for faked messages and error will be detected both by the server 1703 and the client 1701 and the transaction session will be terminated. This clearly is an annoyance for a user of the client device 1701. However, serious adverse effects and loss of money or other valuable property has been prevented.

Messages and hash values are represented by signals. The client device and the server both have transmission circuitry and receiving circuitry. Transmission circuitry includes modulation circuitry to condition the signals for the channel through which the signals are to be transmitted. Different modulation technologies are known, and may include basebad transmission, AM, FM, pulse modulation, pulse-width modulation, Pulse Amplitude Modulation, spread-spectrum modulation, QAM-k modulation or any other modulation or combination of modulation that is useful. Additional circuitry provides error correcting coding. A receiver provides some form of amplification or equalization and demodulation to provide an appropriate digital baseband signal to a processor for further processing. Transmission may include wired and wireless transmission including radio and optical transmission.

N-valued switching functions and n-state inverters with n equal to or greater than 2 can be implemented in different ways: as n-state switching devices, and as switching tables that are stored in a memory as illustrated in the herein provided Matlab code.

Figure 18:
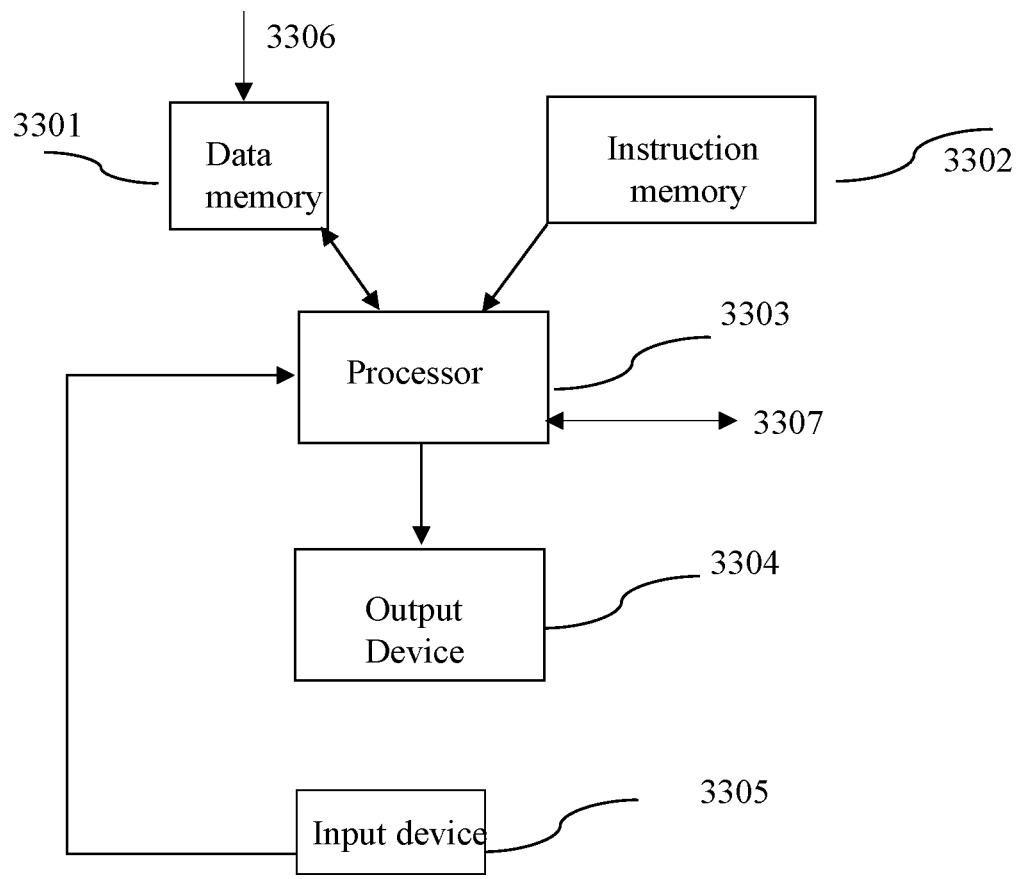
FIG. 18 illustrates a processor based system enabled to perform steps in accordance with at least one aspect of the present invention.

A system illustrated in FIG. 18 and as described herein is enabled for receiving, processing and generating data. The system is provided with data that can be stored on a memory 3301. Data may be obtained from a sensor or may be provided from a data source. Data may be provided on an input 3306. The processor is also provided or programmed with an instruction set or program executing the methods of the present invention is stored on a memory 3302 and is provided to the processor 3303, which executes the instructions of 3302 to process the data from 3301. Data, such as an image or any other signal resulting from the processor can be outputted on an output device 3304, which may be a display to display data or a loudspeaker to provide an acoustic signal. The processor also has a communication channel 3307 to receive external data from a communication device and to transmit data, for instance to an external device. The system in one embodiment of the present invention has an input device 3305, which may be a keyboard, a mouse, a touch pad or any other device that can generated data to be provided to processor 3303. The processor can be dedicated hardware. However, the processor can also be a CPU or any other computing device that can execute the instructions of 3302. Accordingly, the system as illustrated in FIG. 18 provides a system for data processing resulting from a sensor or any other data source and is enabled to execute the steps of the methods as provided herein as an aspect of the present invention.

One definition of a hash function is any function that can be used to map data of arbitrary size to data of fixed size. According to FIPS PUB 202 FEDERAL INFORMATION PROCESSING STANDARDS PUBLICATION SHA-3 Standard (herein "FIPS 202"), which is incorporated herein by reference: Hash functions are components for many important information security applications, including 1) the generation and verification of digital signatures, 2) key derivation, and 3) pseudorandom bit generation. The values returned by a hash function are called hash values, hash codes, hash sums, message digests or simply hashes. One use is in a data structure called a hash table, widely used in computer software for rapid data lookup. A hash function herein further includes a device that executes a hash function. A hash function may be a polynomial expression that for instance processes data and the states of the polynomial after processing determines the hash value. FIG. 12 illustrates a device that implements or realizes a hash function with a shift register with shift register elements with feedback. A feedback loop contains at least one implementation or of a switching element, an at least 2 input/1 output switching device that is realized by a combinational logic elements as known in the art, or a memory that contains a switching table and whereof an output is determined by one or more addresses of 2 inputs, for instance by using an address translator. FIG. 12 in one embodiment of the present invention is a data scrambler of which signals provided on input 1201 are scrambled and provided in scrambled form on output 1214. In another embodiment of the present invention the shift register feedback device of FIG. 12 is operated as a hash function, wherein, after entering one or more signals on 1201 the content of one or more of the shift register elements 1203, 1204, 1205 and 1206 are outputted and used as representing a hash value. The number of symbols represented by input signals on 1201 is generally larger than the number of shift register elements in the shift register with feedback of FIG. 12.

For operation of the device of FIG. 12 as a hash function only, the output 1214 may not be required as no scrambled signal may be required. The content of the shift register is determined by the input signals, the structure of the feedback device and the function of devices 1202, 1207, 1208, 1209, 1210, 1211, 1212 and 1213 and by the initial content of the shift register. The hash function compacts or reduces the input signals to a limited number of signals. The reduction is generally irreversible. That is, it is very difficult, if not impossible to reconstruct an input signal from its generated hash value. However, the hash value in general is used as a "secret" or "confidential" stamp or mark of a signal that is intended to be difficult or impossible to predict. A hash value is associated with a specific signal. When the hash value is recalculated from received signals with the same hash function and initial shift register content a same hash value as calculated at for instance a transmitter should be generated. A device, such as a receiver compares in one embodiment of the present invention a hash value calculated at for instance a transmitter with a hash value calculated at the receiver using the same hash function and setting. A difference between the two hash values may indicate a modification of the message signals.

Using the same hash function over and over again for different messages may provide enough information for a cryptanalysis expert or malfeasant to reconstruct the hash function and thus allowing to modify signals and generate and attach a corresponding hash value. In accordance with an aspect of the present invention a state of a device that calculates a hash value is changed after completion of determining a hash value for a message or file or series of signals. That means that the previous message, which may be any digital message including text, data, audio or image, processed by the modified hash function, will generate a different hash value.

In a first embodiment of the present invention, a binary hash function is used to generate a binary hash value. In one exemplary embodiment the hash function is a binary shift register with feedback wherein the feedback functions are binary switching functions. In general binary functions used in binary shift registers with feedback are reversible functions such as the binary XOR function or the EQUAL function, while the taps in the shift registers with feedback are generally the [0 0] inverter (always open) or the [0 1] inverter which is the identity or the straight-through connection. In accordance with an aspect of the present invention a binary hash value is generated by using at least one binary function that is not an XOR or an EQUAL function in a binary feedback shift register. In accordance with an aspect of the present invention a binary hash value is generated by using at least one binary inverter that is not an identity or an [0 0] (always open) inverter in a binary feedback shift register. A [1 1] inverter is an inverter that is not [0 1] or [0 0]. A [1 0] inverter is an inverter that is not [0 1] or [0 0]. In accordance with an aspect of the present invention, the length of a hash value is preferably at least 50 bits long, more preferably at least 100 bits long and most preferably at least 150 bits long.

The end state of the shift register in a feedback shift register that is provided with a message depends on a) a length of the shift register or the number of shift register elements; b) the structure of the feedback shift register, for instance a Galois or Fibonacci structure; c) the inverters in the taps of the feedback shift register; d) the switching functions in the feedback shift register; e) the state of the shift register; and f) the message. Commonly, a same hash function is used in a system, mostly assuming that message content will be different thus generating different hash values. This places restrictions on hash functions as it is desirable that one does not easily reconstruct a hash function from known messages and their generated hash values.

In accordance with an aspect of the present invention at least one of the above aspects a)-e) is modified to generate a different hash value from a same message. In a binary feedback shift register of 50 shift register elements there are at least 50 taps in which each can have one of 4 binary inverters {[0 1], [1 0], [0 0] and [1 1]}. The first and last tap cannot contain [0 0] or [1 1], but that hardly affects the total variation of configurations. Just in tap structure there can be about $4^{50}$ different tap configurations, which is about $10^{30}$. One is referred to FIG. 12 which illustrates positions of inverters 1207, 1208, 1209 and 1210 in a Galois configuration. Even with a computer that can perform 100 petaflops ($10^{17}$) brute force alone would take an extraordinary long time to predict the structure. Furthermore, there are 12 binary switching functions that are not XOR, EQUAL or all 1s or all 0s that can also be used in the feedback shift registers instead of XOR or EQUAL. There are about at least $14^{50}$ feedback configurations possible in the binary case for a 50 tap binary feedback shift register. The location of devices that perform the functions are illustrated as 1211, 1212, 1213 and 1207 in FIG. 12 which illustrates a feedback shift register with 4 shift register elements.

As an illustrative example one may use the hash function implemented on the device of FIG. 12 with inverter 1207 is [0 1]; inverter 1208 is [0 1]; inverter 1209 is [0 0] and inverter 1210 is also [1 1]. Binary switching functions 1202, 1211, 1212 and 1213 are all the binary XOR function. The input signal is mess=[10101111000101011110000]. The initial state of the shift register [0 0 0 0] generates after processing the entire message 'mess' the hash value or shift register content [0 1 0 0]; the initial state [1 0 0 0] generates from the same message the hash value [0 0 0 1]; and initial shift register state [1 0 1 1] from the same message generates hash value [1 0 0 1]. The length of the hash value is 4 bits so that 16 different values can be generated. For security one should use much longer shift registers. But the above example illustrates the effect of changing the initial state of the hash function as an aspect of the present invention.

As a further aspect of the present function the state of the shift register is modified after processing k symbols of the message. For instance after processing 9 symbols (bits in the binary case) the content of the shift register is modified with a word of the same number of symbols. As an illustrative example, the word [1 1 0 0] is combined with a content of the shift register of FIG. 12 after 9 symbols in the message 'mess' have been processed starting from an initial content [1 0 1 1]. The combining takes place by applying the binary function EQUAL to the entire actual content and the word [1 1 0 0]. This will generate the hash value [1 0 1 0]. By changing the word to [1 0 0 0] the same message will generate the hash value [1 1 1 0]. In accordance with an aspect of the present invention all or some of the symbols in the 'word' are used to modify the content of the shift register. Symbols in the shift register may be combined with the same or with different switching functions. XOR and EQUAL functions may be used, but other non-reversible functions are also contemplated. For instance, the first three symbols in the word and the shift register content are combined with the EQUAL function and the $4^{th}$ symbols with the NAND function. With the word being [1 0 0 0] and modifying the shift register content after processing the $9^{th}$ symbol of the message will generate the hash value [1 1 1 1]. A word may be predetermined and stored in a memory for appropriate retrieval. A word may also be determined from external data, such as the message, such as symbols 3, 4, 5 and 7 in the message. One may also repeat certain symbols in a message to form a word.

As an aspect of the present invention the switching functions in the hash functions are modified. As with the previous aspects, one or more functions can be changed for each new message, but one or more function is also changed during processing of a message. In one illustrative example all the 2 input single output devices 1202, 1211, 1212 and 1213 implement or execute the binary XOR function. The message 'mess' with initial shift register content [1 0 1 1] will generate hash value [1 0 0 1]. The same message with the same initial state of the shift register but all devices 1202, 1211, 1212 and 1213 now executing the binary EQUAL function will generate the hash value [0 0 0 1]. One may also change only 1211 to execute an EQUAL function while or others execute XOR, which will generate hash value [0 1 0 1] and further change 1212 to execute an AND function, which will generate hash value [0 1 0 0].

In accordance with an aspect of the present invention one or more taps in a device to execute a hash function to generate a hash value of a message are modified by modifying an inverter. Herein an open connection (in the binary case) is inverter [0 0] and a straight through connection is the unity inverter [0 1]. Two other possible binary inverters are [1 1] (always on) and [1 0] (the symbol inversion). That means that in the binary case one may chose 1 of 4 inverters for every tap, except the last and the first tap, which cannot be [0 0] or [1 1]. One may also insert inverters anywhere else where a signal path is in a device.

One should be aware that even when an inverter is [0 0] that in combination with the function, it may change a signal or symbol. For instance 1210 in FIG. 12 is [0 0]. If 1213 executes the XOR function then it appears that 1213 acts as a straight through connection between shift register elements 1205 and 1206. However, if 1213 executes the EQUAL function, then 1210 being [0 0] makes 1213 appear as inverter [1 0] between 1205 and 1206. One can easily visualize this by writing out the respective truth tables of the functions and inverters.

In an instance of the device of FIG. 12 with initial state [1 0 1 1], 1208 implements [0 1], 1209 implements [0 0] and 1210 implements [0 0], while all "2 input" functions are XOR functions. The binary message 'mess' generates hash value [1 0 0 1]. In another illustrative example the device 1211 in FIG. 12 after processing 10 symbols by the shift register with feedback, is changed to implement an EQUAL function to process the remainder of the message. This has the message 'mess' generate the hash value [0 0 0 1].

In a similar approach all functions implemented by 1211, 1212 and 1213 are and remain XOR functions. However, inverter 1210 is changed from [0 0] to [1 0] after processing 10 symbols of the message 'mess'. This causes the hash value [1 0 0 0] to be generated.

There are at least two effects that are of significance here. A first effect is that, when a hash function is used multiple times, with preferably different messages, it is made very difficult to reconstruct or even guess what the internal structure of the coder or hash function, such as illustrated in FIG. 12, actually is. One basic assumption for a cryptanalyst may be that a device in a set configuration generates a hash code or actually codes a message. If such a device will be used in the same configuration more than once, it could be subject to attacks to determine the configuration. A malfeasant may try to guess or determine a configuration that generates a particular hash value. On the basis of a single message it is highly unlikely that the malfeasant or cryptanalyst will be successful. That is: a configuration (including function states) may be found that generates a particular hash value. One has to keep in mind that different configurations may generate the same hash value for a particular message, but very likely will generate a different hash value for a different message. Accordingly, a reconstructed configuration may be used when a message is intercepted, modified and provided with a hash value in accordance with the reconstructed configuration. At the receiving end the proper hash function is used and most likely will generate a different hash value, thus exposing the message as improperly modified.

In accordance with an aspect of the present invention one may use the same hash function for a limited number of messages, preferable for not more than 20 messages, more preferably for not more than 10 messages, even more preferable for not more than 5 messages and most preferably for not more than 1 message. In accordance with an aspect of the present invention one may use the same hash function for a limited lime, preferable for not more than 24 hours, more preferably for not more than 12 hours, even more preferable for not more than 6 hours and most preferably for not more than 1 hour.

Figure 20:
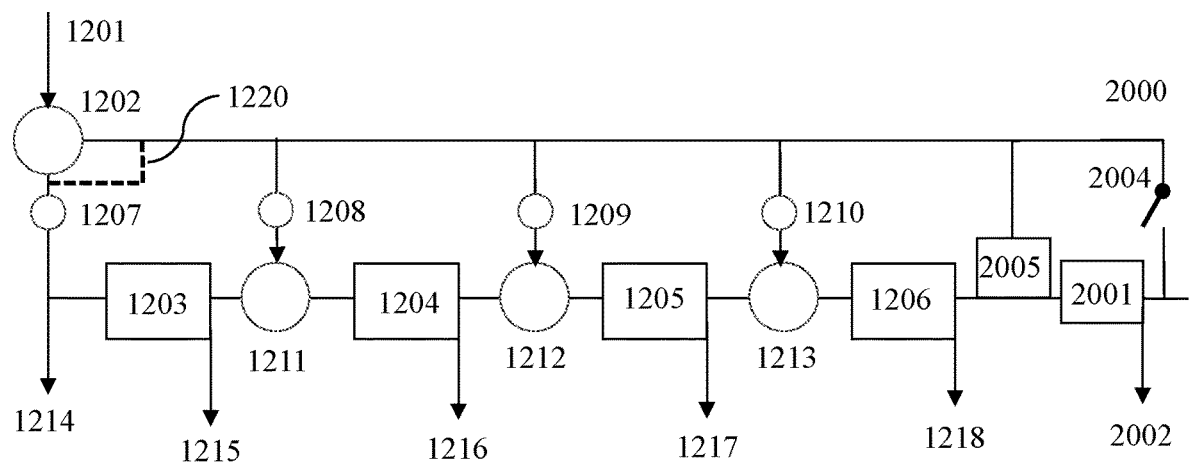
FIG. 20 is a feedback shift register in accordance with an aspect of the present invention.
Figure 21:
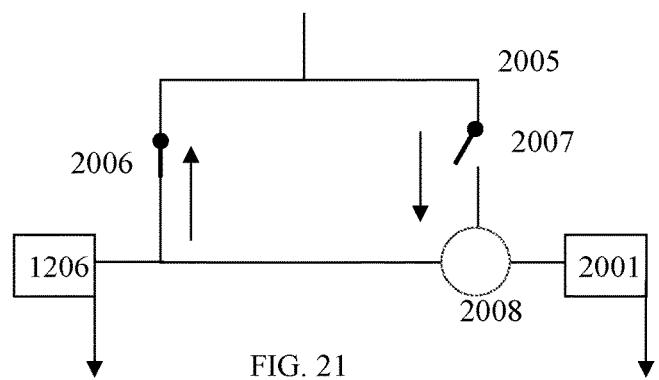
FIG. 21 is a modified feedback shift register in accordance with an aspect of the present invention.

In one embodiment of the present invention a length of a shift register is changed. This is illustrated in device 2000 in FIG. 20 which has a basis the configuration of FIG. 12 but is extended with an additional n-state shift register element 2001 which is activated by a controlled switch 2004 and a switched device 2005. Details of device 2005 are illustrated in FIG. 21, which also shows shift register elements 1206 and 2001 for context. Device 2005 has switches 2006 and 2007 which operate in a complementary fashion, if 2006 is closed 2007 is open and vice versa. Also included is the n-state feedback function 2008. When 1206 is the last active shift register element of 2000 then 2006 is closed and 2007 is open. When 2001 is a next active shift register element in 2000 then 2006 is open and 2007 is closed, also activating 2008. Switches 2004 and 2007 are closed at the same time and also open at the same time. A similar extension is contemplated for Fibonacci configurations. The extension can be longer than 1 shift register element by adding additional shift register elements and devices like 2005.

FIG. 22 is a screenshot from a computer interface that shows a computer generated listing of Matlab script that implements a change of length of a 4-state shift register after 8 4-state symbols have been processed. For simplicity all inverters have been made identity and all switching functions are represented by an addition over a finite field GF(4), keeping in mind that Matlab operates in origin 1, while switching tables are usually represented in origin 0. As an example the 4-state sequence [0 1 2 3 0 1 2 3 0 1 2 3 0 1 2 3] is scrambled and the length of the shift register is increased with 1 after processing 8 symbols. The initial state (shifts4) of the shift register is [2 3 1 4 2] in origin 1. Without changing the feedback length the final state of the shift register would be [4 2 4 3 1]. By increasing the feedback length after 8 symbols the final content is [4 1 4 4 2]. In accordance with an aspect of the present invention, the feedback length change is programmable. In accordance with an aspect of the present invention the actual length of the shift register is larger than required for an initial feedback loop. However, by pushing content into a longer shift register a content is available for a feedback loop of increased length. By using a programmable processor the working of the processor as a coder and as a shift register with feedback has been improved and rendered less predictable from its output by changing the feedback loop. One can output still only the content of 4 shift registers even after the feedback loop has been increased. These configurations are also implemented in hardware such as FPGAs. However, changing configurations then is more complicated and fewer configurations are then possible.

Considering the possible number of configurations of binary feedback shift registers with preferably 20 or more shift register elements, more preferably with more than 30 shift register elements, even more preferably with more than 40 shift register elements and most preferably with at least 50 shift register elements, it would be extremely hard to crack the hash function, let alone predict the configuration in view of the mentioned modifications as disclosed herein that can be applied.

The configuration can be modified at least once and preferably more than once during processing of a message. A message herein is any series of signals that can be represented by a series of binary symbols or n-state symbols with n greater than 2.

Other possible modifications to processing symbols are also contemplated as aspects of the present invention. In one aspect one may skip at least 1 symbol in a message to determine a hash value. For instance in the above mentioned example for a configuration that generates hash value [1 0 0 1] symbol 11 in message 'mess' is skipped to determine the hash value. In that case hash value [0 0 0 1] is generated. Skipping symbols 11 and 12 causes a hash value [1 0 0 0]. In one aspect at least one symbol in a message is used multiple times to determine a hash value. For instance using symbol 11 twice, consecutively, will generate hash value [1 1 0 1]. For instance using symbol 13 for the second time at the end of the message sequence will generate [0 0 0 0]. Accordingly where one skips a symbol or where a symbol is added in a message affects the hash value. In accordance with an aspect of the present invention a pre-determined symbol is added to the message at a pre-determined location in the message to determine a hash value.

There are different ways to implement modifications in configurations and in inserting and skipping symbols or modifying contents of shift registers. A first realization uses different fixed configurations of feedback shift registers with controllers and switches. At the correct time (after counting a predetermined number of processed symbols) a switch is activated by the controller that activated a device in the new configuration and de-activates the previous configuration. Buffers may be used to convert contents of shift register elements if the previous state cannot be used. For certain modifications a controller activated switch may be used to activate a particular inverter or 2-input/single output functions which may be realized in combinational logic devices or addressable memory that stores a switching tables, PROMS, ROMS, Field Programmable Gate Arrays (FPGAs) or any hardware that implements the required switching table.

Figure 19:
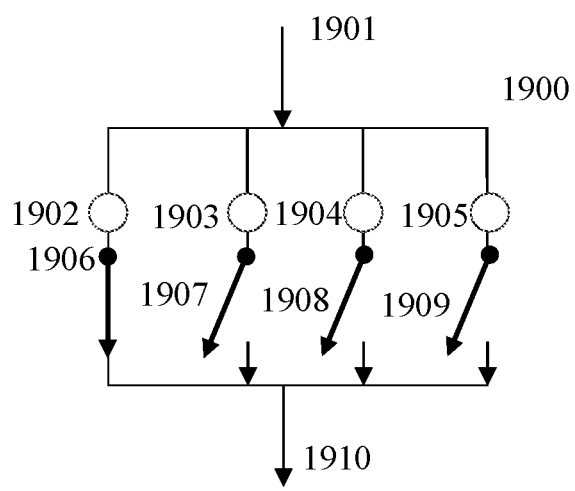
FIG. 19 illustrates an inverter device in accordance with an aspect of the present invention.

Now referring to FIG. 19 wherein a controlled modifiable inverter 1900 is illustrated. The device 1900, which in one embodiment of the present invention is a combinational circuit, in another embodiment of the present invention is a programmable processor with memory, and in a third embodiment of the present invention is a mix of combinational and memory circuitry, with for instance an addressable switching table stored in a memory, is a controlled modifiable inverter. In this illustrative example 4 n-state inverters: 1902, 1903, 1904 and 1905 are shown wherein n in one embodiment of the present invention n is an integer with n=2 or in another embodiment is n>2. Also shown are controlled switched 1906, 1907, 1908 and 1909. A switch can be closed or open. Switch 1906 is shown closed and 1907, 1908 and 1909 are open. As a consequence inverter 1902 is active for a signal provided on input 1901 and the signal inverted by 1902 is provided on output 1910. The switches are operated so that only one of the switches is closed. For instance if 1908 were closed then 1906, 1907 and 1909 would be open rendering their corresponding inverters inactive while 1904 would be active.

As a further example, the 4 n-state inverters 1902, 1903, 1904 and 1905 are 4-state inverters determined by the following switching 1-by-4 switching tables. Inverter 1902: [0 1 2 3]→[1 2 3 0]; inverter 1903: [0 1 2 3]→[2 3 0 1]; inverter 1904: [0 1 2 3]→[3 2 1 0] and inverter 1905: [0 1 2 3]→[1 3 0 2]. When a signal representing 4-state symbol 2 is inputted on 1901 and 1906 is closed and 1902 is active, a signal representing symbol 3 is provided on output 1910. If switch 1909 is closed, then a signal representing symbol 2 is provided on 1910.

There are different ways to generate a hash value. Also hash values are known under different names such as message digest and checksum, cyclic-redundancy codes and others often associated with methods and functions of generating a hash value. A common feature is that the hash function is one-way and reduces a message to a one format value. The purpose of a particular hash value may differ. It may be for error detection or for more secure purposes such as authentication. In the case of authentication it may be desirable that preferably only one particular message generates a particular hash value and it is virtually impossible to modify a message and still generate the same hash value generated with an original message. In many applications pre-image resistance and collision resistance of a hash function are desirable. A hash function preferable generates a hash value that depends upon a position of a symbol in a message.

Another example of generating a hash value is the SHA-1 and updated SHA-2 standard as described in FIPS Publication 180-2 (with Change Notice 1) (change notice dated Feb. 25, 2004), (herein "FIPS 180-2") entitled SECURE HASH STANDARD which is incorporated herein by reference. FIPS 180-4, published by NIST on August 2015 being an update of FIPS 180-2 is also incorporated herein by reference. Federal Information Processing Standards Publications (FIPS PUBS) are issued by the National Institute of Standards and Technology (NIST) after approval by the Secretary of Commerce pursuant to Section 5131 of the Information Technology Management Reform Act of 1996 (Public Law 104-106), and the Computer Security Act of 1987 (Public Law 100-235).

Examples of hash value generators, in accordance with various aspects of the present invention, include without limitation, MD5, MD6, SHA-1, SHA-256, SHA-512, any SHA3 candidate operation, as well as combinations of the herein mentioned hashing methods. This also includes use of hashing methods BLAKE, Blue Midnight Wish, GOST, Grøstl, Haval, CubeHash, ECHO, Fugue, Grostl, Hamsi, JH, Keccak, LANE, Luffa, Poly1305, Shabal, SHAvite-3, RIPEMD, SIMD, VMAC, UMAC, Snefru, RADIOGATUN, Whirlpool and Skein. In other embodiments, the hash function is derived using other known constructions such as, without limitation, Matyas-Meyer-Oseas, Davies-Meyer, Miyaguchi-Preneel, Merkle-Damgard. All the above are addressed herein as "Standard Hash" as being published and having a known structure, may be un-keyed or keyed and often define constants and secret keys. All hashing methods herein are one-way or non-reversible functions, in the sense that an input message cannot be unambiguously derived from the generated hash value and the structure of the hash function or hash method. In accordance with an aspect of the present invention a hashing is a one-way hashing and is a cryptographic operation.

A message digest or hash is generated from an input sequence of signals which are interpreted as symbols. In general it should not matter how many input symbols there are: many or few they all should generate a hash or digest of a required length. The recent SHA-3 hash which is derived from Keccak applies a sponge function approach which is different from functions applied in earlier hash standards and allows for a variable size output. However, all these hashing approaches require some form of padding of input sequences. In fact all of the SHA FIPS standards apply at least two steps: (1) padding of the input symbols into multiple blocks of data and arranging these blocks in a pre-defined manner and (2) modifying the data of the blocks. The SHA-1 standard will be used herein as an illustrative example of these steps. SHA-1 is no longer considered to be secure. However, steps used in SHA-1, including padding, initial values, transposition (usually rotation) parsing, modifying with switching functions, arithmetical operations and different rounds are also applied in newer hash functions. Thus examples related to SHA-1 provided herein are also exemplary and applicable to other hashing approaches and standards.

SHA-1 creates in one or more steps one or more sequences of 512 bits. A sequence of 512 bits is parsed (divided) into 16 words of 32 bits. The 16 32-bit words are expanded (padded) into 80 words of 32 bits by XOR-ing 4 previous words (at t−3; t−8, t−14; and t−16) and then left rotating by 1 bit of the resulting word of 32 bits. This is called an accumulating step herein: it forms a new word by assembling/combining/accumulating earlier words. Many hashing approaches, including SHA-3 and other sponge based approaches, include an accumulation or expansion step.

SHA-1 and variants thereof such as SHA-256, SHA-384 and SHA-512 for instance apply the XOR, as an accumulating function, both for parsing steps and for modification steps. The XOR function is also a defined function in SHA-3 in the "absorbing" phase of the sponge function and in the [f] modification, for instance in the $\theta(A)$, $\chi(A)$ and what is called the $\iota$ mapping in the SHA-3 specification wherein a total round is defined as $Rnd(A, i_r)=\iota(\chi(\pi(\rho(\theta(A)))), i_r)$. The sponge function SPONGE[f, pad, r](N, d), algorithm 8 in the SHA-3 specification also applies an XOR function.

The SHA-1 and related hashing apply a true accumulation function, usually in the form of an addition. Any true addition in binary representation generally applies a XOR function. The XOR and true accumulation differ in the aspect of the carry digit. The XOR is a switching function that is performed by a physical device. Its performance can be described by the modulo-2 addition truth table. The true addition is achieved in a switching circuit that generates a signal equivalent to a carry bit, as is known in computer arithmetic. In one example a ripple adder can be realized with XOR and AND switching functions, wherein the AND switching function generates the carry bit. This true accumulation, or addition, is for instance used in the "operations on words" as defined in section 3.2 of the SHA-1 modified specification. Herein two binary inputs (2 32-bit words) x and y are added as $(x+y) \mod 2^{32}$. This operation is a true addition that is truncated after 32 bits. The addition is also used in determining the final or intermediate hash value by adding modulo(32 bit) the intermediates variables with an earlier intermediate (or initial) hash value.

It was shown in U.S. Pat. No. 7,772,999 (the "999 patent") issued on Aug. 10, 2010 to Lablans, which is incorporated herein by reference that the physical realization of addition is enabled for instance by a ripple adder scheme. Such a ripple adder scheme is generally in binary switching form in combinational circuits, but can also be realized by implementation of the required switching tables in look-up tables for instance in addressable memory. The use of non-binary switching tables in memory as part of a general or customized processor enables non-binary switching to be performed on binary realizations. The use of stored switching tables allows for the re-use of these tables in different or iterative operations and may require less hardware than combinational circuitry. In US Pub. No.: US 2012/0284533 to Assche et al. ("Assche") published on Nov. 8, 2012 and which is incorporated herein by reference, describes the use of non-binary modulo-r operations, with r is an integer greater than 2 and not being a power of 2. The non-binary functions used in Assche to create the modulo-r operations are the modulo-r addition, subtraction and/or multiplication or taking the modular (r) additive or multiplicative inverse, which are all standard modulo-r arithmetical operations. Assche discloses, what is called, a modulo-r operation to binary representations of non-binary digits in a sponge function or another operation defined as: $C\_i=K00\_i+K10\_i*A\_i+K01\_*B\_i+K11\_i*A\_i*B\_i$. The '+' and '*' operation are thus standard additions and multiplication modulo-r.

In accordance with various aspects of the present invention a hashing function or message digest as captured by the class of "Standard Hash" is partially processed as a binary symbols by one or more devices implementing or realizing one or more binary switching function and partially as n-state symbols with one or more devices implementing or realizing one or more n-state switching function. There are different ways to achieve this partial non-binary processing. This requires a circuit to initiate the n-state processing by executing one or more instructions that sets the value of n (n>2). One way is to parse an input sequence into a symbol of n-state symbols. In the case wherein $n=2^p$, the binary sequence can be interpreted as a sequence of non-binary symbols wherein for instance p consecutive symbols are interpreted as a symbol with value $n=2^p$, with for instance 2 consecutive bits establishing a 4-state symbols and 3 consecutive bits an 8-state symbol. A circuit provided with binary signals is able to convert and interpret the binary sequence as a sequence of n-state symbols. This is called a full conversion.

In accordance with an aspect of the present invention a full conversion from binary to n-state of a binary sequence is also preferred when n is not a power of 2. Assche, for instance describes an incomplete conversion from binary to 5-state or 7-state and achieves that by using only 2 bits of a binary sequence (representing 0, 1, 2 and 4) and converts to for instance a 3-bits 5 state or 7-state symbols. However 3 bits can represent the numbers 0-7. In the 5-state case the symbols 0, 1, 2, 3 and 4 need to be represented. A 3-bit representation would have [0 0 0]=0; [0 0 1]=1; [0 1 0]=2; [0 1 1]=3 and [1 0 0]=4 as 5-state representations. This means that when derived from 3 bits, one 5-state symbol (in this case the 4) would not appear in the converted 5-state sequence. This creates an imbalance or bias in the initial setting that may be explored in cryptanalysis and is undesirable. A full conversion from binary to n-state with n not being a power of 2 is thus required. A full conversion is determined by representing a multi-digit number radix-10 into a number radix-2 and radix-n wherein all radix-n symbols are allowed during conversion. Matlab has a statement that determines a full conversion: "str=dec2base(d, base, n)" which converts a radix-10 number d to a number of n-digits in radix 'base.' It can be converted back to radix-base by d=base2dec(str,base). A simple way for a complete 5-state conversion of a binary sequence seq2 to a 5-state sequence seq5 is thus: dseq2=base2dec(seq2,2) and seq5=dec2base(dseq2,5). Full conversion of between binary and radix-n or base-n representation, both in hardware realization as in programmed approaches are well known. The above example illustrates a programmed approach. Hardware implementation with a systolic array is provided in the article "Systolic Number Radix Converters" by B. Parhami, published in THE COMPUTER JOURNAL, VOL. 35, NO. 4, 1992, pages 405-409, which is incorporated herein by reference.

As an illustrative example the initial hash value H1=efcdab89 (hexadecimal) from section SHA-1 from FIPS180-2 is used to convert to 5-state in both manners. H1 in binary is '11101111110011011010101110001001.' In the incomplete Assche way the 5-state conversion will be: '3233303122232021.' A complete conversion will generate '31214421432132,' which requires fewer symbols. The incomplete conversion will not create any symbol 4 in the 5-state representation. A similar issue arises when the incomplete conversion is applied in a 7-state conversion. This generates the same sequence '3233303122232021' while the complete conversion is '201461630330.' It should be noted that Assche is not trying to achieve complete conversion, but presumably only a 7-state representation of a sequence of bits serving as the input to a modulo-7 operation, which should be implemented in combinational circuitry to distinguish from programmed implementation on a processor.

In accordance with an aspect of the present invention a round or a part of a round in a Standard Hash is performed upon signals representing n-state symbols by switching circuits implementing one or more n-state switching functions. In one embodiment of the present invention n is a power of 2 and in another embodiment of the present invention n is not a power of 2. A round herein is a series of steps to generate an intermediate hashing result. For instance SHA-1 distinguishes pre-processing, including setting initial values, padding and parsing, and 4 rounds of modifications wherein each round has 20 consecutive cycles and 3 of the 4 rounds applies at least different modification functions. (round 20-39 and 60-79 apply the same function Maj(x,y,z) at explained in 4.1.1 of FIPS 180-2. A round in SHA-3 is the set of mappings defined by $\theta$, $\rho$, $\pi$, $\chi$ and t as defined by FIPS 202.

In accordance with an aspect of the present invention a single step, including a pre-processing step, is performed in an n-state operation. As an illustrative example the SHA-1 example of FIPS 180-2 is used. Herein the string 'abc' results in a 160 bits message digest 'a9993e36 4706816a ba3e2571 7850c26c 9cd0d89d' in hex-notation. In one exemplary example, the pre-processing step of parsing in SHA, that is generating the 80 words from the initial 16 words which is called preparing the message schedule with ROTL$^1$ ($W_{t-3} \oplus W_{t-8} \oplus W_{t-14} \oplus W_{t-16}$) with $\oplus$ being the bit-wise XOR function. Instead of using binary switching tables the words are represented as 5-state words. The first binary word of 32 bits in the SHA-1 schedule is '01100001011000100110001110000000.' Complete conversion of this word into 5-state symbols provides 15 5-state symbols '011321230303302.' In accordance with an aspect of the present invention, the other initial 15 32-bit words are also completely converted to words of 15 5-state symbols. In accordance with an aspect of the present invention the remaining 64 words of the message schedule are generated in this example by the expression:

'ROTL$^1$($W5_{t-3} \nabla W5_{t-8} \nabla W5_{t-14} \nabla W5_{t-16}$)' wherein $\nabla$ is a 5-state switching operation defined by a 5 by 5 5-state switching table. The 5-state switching table sc5 that is used to generate the 5-state based message schedule is:

| sc5 | 0 | 1 | 2 | 3 | 4 |
|---|---|---|---|---|---|
| 0 | 4 | 3 | 2 | 1 | 0 |
| 1 | 3 | 2 | 1 | 0 | 4 |
| 2 | 2 | 1 | 0 | 4 | 3 |
| 3 | 1 | 0 | 4 | 3 | 2 |
| 4 | 0 | 4 | 3 | 2 | 1 |

The circuit for generating the message digest of 'abc' in one embodiment of the present invention returns the thus generated 64 5-state words to 64 32 bits words, which are different from the originally binary words generated with the XOR switching. As a result the message digest will be '74949A85 F6F03428 73E857CC 168A1482 4663E9FE' in hexadecimal form and is different from the standard form. The applied 5-state switching table sc5 is reversible and has a form that provides a balanced output without favoring a specific output symbol. The table sc5 is not a modulo-5 addition or multiplication does not take the modular (r) additive or multiplicative inverse. In accordance with an aspect of the present invention an n-state function with n>2 to generate intermediate results such as message schedule words is defined by an n-by-n switching table that is reversible and commutative and is not a modulo-r addition or multiplication. In a further embodiment of the present invention the n-state function is defined by an n-by-n switching table that is reversible and commutative wherein two inputs 0 do not as output generate a 0, as illustrated in sc5 above. The function sc5 can be replaced by many other functions that are reversible and commutative and are not an addition or multiplication modulo-5, wherein inputs (0,0) do not generate a 0, such as shown in switching table sc5a.

| sc5a | 0 | 1 | 2 | 3 | 4 |
|---|---|---|---|---|---|
| 0 | 3 | 2 | 1 | 0 | 4 |
| 1 | 2 | 1 | 0 | 4 | 3 |
| 2 | 1 | 0 | 4 | 3 | 2 |
| 3 | 0 | 4 | 3 | 2 | 1 |
| 4 | 4 | 3 | 2 | 1 | 0 |

The message digest using sc5a in generating the message schedule of SHA-1 of string 'abc' is: '9546CA0F FE0EFC49 39A1B95E 156557F5 97336829' in hexadecimal notation.

In accordance with an aspect of the present invention different functions, such as sc5 and sc5a, are used in the generating of the message schedule corresponding to 'ROTC($W5_{t-3} \nabla 1 W5_{t-8} \nabla 2 W5_{t-14} \nabla 3 W5_{t-16}$)', wherein $\nabla 1$, $\nabla 2$ and $\nabla 3$ represent at least 2 different switching tables. For instance the message digest of 'abc' using $\nabla 1$=sc5, $\nabla 2$=sc5a and $\nabla 3$=sc5 is '7F9DCBE2 0858DD5F CC610E87 A2AA7DE4 0147A89E.' In yet another embodiment of the present invention the switching table is reversible and non-commutative, such as sc5b provided below.

| sc5b | 0 | 1 | 2 | 3 | 4 |
|---|---|---|---|---|---|
| 0 | 0 | 4 | 3 | 2 | 1 |
| 1 | 1 | 0 | 4 | 3 | 2 |
| 2 | 2 | 1 | 0 | 4 | 3 |
| 3 | 3 | 2 | 1 | 0 | 4 |
| 4 | 4 | 3 | 2 | 1 | 0 | with message digest 'B552DACB 4178A0D2 0E3EFB1F BC15481C 593525E6' when all applied functions in the message schedule are sc5b.

In one embodiment of the present invention the non-commutative function provides not a 0 when both inputs are 0 as demonstrated in sc5c below.

| sc5c | 0 | 1 | 2 | 3 | 4 |
|------|---|---|---|---|---|
| 0 | 3 | 2 | 1 | 0 | 4 |
| 1 | 1 | 0 | 4 | 3 | 2 |
| 2 | 0 | 4 | 3 | 2 | 1 |
| 3 | 4 | 3 | 2 | 1 | 0 |
| 4 | 2 | 1 | 0 | 4 | 3 |

Using sc5c only as explained above will generate digest '6773DBCD C94CB94B 3622E641 59F8951E 68929A5E.'

Using both sc5b and sc5c in the schedule generation will generate digest '2165862D CDE8FEC9 DBD8D44B 6E029645 6385EC72.'

In one embodiment of the present invention a modifying or accumulating function is not reversible as shown for instance in sc5d

| sc5d | 0 | 1 | 2 | 3 | 4 |
|------|---|---|---|---|---|
| 0 | 3 | 2 | 1 | 0 | 4 |
| 1 | 1 | 0 | 4 | 3 | 2 |
| 2 | 0 | 4 | 3 | 2 | 1 |
| 3 | 4 | 3 | 2 | 1 | 0 |
| 4 | 4 | 1 | 0 | 4 | 3 |

Using sc5d instead of sc5c in the earlier example will generate digest 'CEE62072 E427E1E2 C1893BF3 42716DF7 7802DFD6' hexadecimal.

In accordance with an aspect of the present invention a modified modifying function is generated by applying a reversible n-state inverter. In the 5-state case there are 5!=120 reversible inverters. One reversible 5-state inverter is [0 1 2 3 4]→[2 3 0 4 1]. This inverter modifies sc5d (which is not reversible) to switching table sc5dm as provided below by substitution of the output states in accordance with the n-state inverter.

| sc5dm | 0 | 1 | 2 | 3 | 4 |
|-------|---|---|---|---|---|
| 0 | 4 | 0 | 3 | 2 | 1 |
| 1 | 3 | 2 | 1 | 4 | 0 |
| 2 | 2 | 1 | 4 | 0 | 3 |
| 3 | 1 | 4 | 0 | 3 | 2 |
| 4 | 1 | 3 | 2 | 1 | 4 |

This generates the message digest 'F10DACF8 A0FE51C5 79563C04 FCD87E48 A3F77CC6.'

In accordance with an aspect of the present invention an n-state switching table is modified by applying an n-state inverter (reversible or irreversible) to an input. For instance an inverter inv51=[2 1 4 3 0] is applied to change the input determining rows of the switching table sc5d and inv52=[3 4 0 1 2] to change the input that determines the columns of the switching table sc5d. This will generate switching table sc5di:

| sc5di | 0 | 1 | 2 | 3 | 4 |
|-------|---|---|---|---|---|
| 0 | 2 | 1 | 0 | 4 | 3 |
| 1 | 3 | 2 | 1 | 0 | 4 |
| 2 | 4 | 3 | 4 | 1 | 0 |
| 3 | 1 | 0 | 4 | 3 | 2 |
| 4 | 0 | 4 | 3 | 2 | 1 |

This generates digest '416EE2AF CC5A550F 5816CCAF 11C23A2493210347' in hexadecimal under the SHA-1 scheme. Other modifications or versions of an n-state function are possible wherein n is a power of 2 and wherein n is not a power of 2 wherein the modified or new function is not an addition or multiplication modulo-n. The number of possible 5-state functions that are not addition or multiplication mod-5 is quite large and fairly unpredictable. This renders an expression 'ROTC$^1$(W5$_{t-3}$ ∇1W5$_{t-8}$∇2W5$_{t-14}$∇3 W5$_{t-16}$)' to generate a message schedule even more unpredictable, especially because all possible functions ∇1, ∇2 and ∇3 can be different and selected from at least 500 and more different 5-state functions. One is reminded that there are $5^{25}$ different 2-input/1 output different switching functions. Many of these functions are non-associative and nonlinear.

Moving from 5-state to 7-state representation provides an exponentially greater variation in selected functions. Preferable one selects a substantially balanced switching table, which means that preferable all possible states are uniformly distributed over columns and rows with no repeat or a repeat that does not exceed 10% in a row or a column for a function that is applied in an accumulation or padding step. The message schedule step is such an accumulation step. An accumulation step is different from a modifying step which is used to modify symbols towards generating an intermediate or final hashing value or message digest. An accumulation step in SHA-3 for instance is the sponge function that absorbs additional symbols or a padding function that creates addition symbols (padding) in an input sequence as described in FIPS 202 section 4. The sponge therein applies the XOR function which, in accordance with an aspect of the present invention, is replaced by a non-binary function with a switching table as provided above. The input sequence in SHA-3 is a bit sequence that is padded where required. In accordance with an aspect of the present invention the sequence as provided to the sponge construction is a sequence that is at least partially interpreted and processed as a sequence of n-state symbols.

Now referring to FIG. 23 for illustration of additional aspects of the present invention. FIG. 23 is based on FIG. 7 in FIPS 202 which illustrates the sponge construction, which is related to FIG. 3B of the Assche patent. Both in FIPS 202 and in the Assche patent, the absorption and squeezing phase apply the same function f (involving a transformation and/or transposition) and apply the same "accumulation" function for all cycles or phases. A cycle or phase in FIG. 23 is where data is entered or accumulated and then transformed and would include input data 2302 (possibly modified by radix-n conversion 2305), 2303 and 2304, wherein 2305 is accumulated with 2303 and then modified by transformation 2309 and then presented again as r and c components to the next phase and cycle. The input data 2301 is padded by padding device 2302. In accordance with an aspect of the present invention data 2302, 2303 and 2304 are binary data. Data strings of equal size are combined by functions 2307, 2312 and 2317. In accordance with a further aspect of the present invention, the functions 2307, 2312 and 2317 are of a different state or value of n. For instance 2307 may be a 5-state function, function 2312 may be an 8-state function while 2317 is a binary function which may be selected from the XOR and the EQUAL function.

In accordance with an aspect of the present invention the functions as applied in a sponge device as illustrated in FIG. 23 are all n-state functions with n>2. In accordance with an aspect of the present invention the functions as applied in a sponge device as illustrated in FIG. 23 are all n-state functions with n=2 of which at least one is the EQUAL function.

To emphasize that the basic unmodified SHA-3 message digest as defined in FIPS 202 a binary process is, it is assumed that the output of 2302, the initial value 2303 and 2304 are all binary sequences. Switching functions 2307 and 2312 are non-binary such as a 5-state and an 8-state function. In order to correctly process non-binary symbols devices 2305 and 2306 perform complete binary-to-n-state conversion as discussed above. Device 2308 completely converts the non-binary symbols back to signals that represent binary symbols. Thus binary symbols are provided to device 2309 for performing the transformation function, which is binary and is called fin FIPS 202 and of which the output is again binary sequences.

In accordance with an aspect of the present invention SHA-3 is modified to have in one embodiment all the steps to be performed on non-binary symbols with non-binary operations, including transformation 2314. In one embodiment of the present invention at least one phase (combination 2312 and transformation 2314) is performed as a non-binary operation. This requires a complete binary to n-state transformation by devices 2311 and 23 11 and by 2310. Switching function 2312 is a non-binary switching function and 2314 performs a non-binary transformation. If the next phase is again fully binary then full converters 2313 and 2316 are required and 2317 is an XOR or EQUAL function or a mix or change of XOR and EQUAL functions.

The cycle that includes 2312 and 2314 is performed on n-state symbols with n-state operations. This also applies for 2314. Conversion from binary to non-binary reduces the number of non-binary symbols compared to the original number of binary symbols. For instance two sequences of 16 bits require 16 2 input/1 output switching to generate again 16 bits, for instance with XOR. The 16 bits can be reduced to 8 4-state symbols and only 8 operations are required, even if they operate on 2 bit representations. The device 2314 performs n-state operations and requires thus fewer n-state operations compared to binary ones. The function f of FIPS 202 is a set of 5 binary operations defined as Keccak-p permutations, wherein a round of a KECCAK-p permutation, denoted by Rnd, consists of a sequence of five transformations, which are called the step mappings. The permutation is specified in terms of an array of values for b bits that is repeatedly updated, called the state; the state is initially set to the input values of the permutation.

In accordance with an aspect of the present invention the initial content of the hashing, provided as 2303 and 2304 is set as not being all 0 or all 1. In accordance with an aspect of the present invention the initial content of the hashing, provided as 2303 and 2304 is set as a plurality of non-binary or n-state symbols with n>2.

The 5 transformations in SHA-3 are denoted by $\theta$, $\rho$, $\pi$, $\chi$, and $\iota$. They are all binary operations, meaning that they involve modifying signals as individual binary symbols, usually with the XOR operation, but also the AND and NOT operation as shown in FIG. 6 of FIPS 202. In one embodiment of the present invention the established SHA-3 transformations are used. In one embodiment of the present invention the Keccak-p permutations of SHA-3 are modified to process 8-state symbols. That is, place in a sequence or array like the state array that holds a binary symbol is configured to hold a non-binary symbol. For instance section 3.1.2 of FIPS 202 teaches how to convert a line or linear string or sequence of b bits into a 3-dimensional array A. The conversion puts a symbol S(i) with i the one dimensional coordinate of the sequence into position (x,y,z) in array A as A(x,y,z). Wherein the array has a fixed dimension of (5,5,w). The size of w is based on the size of the sequence S that is to be permutated. With a 5 by 5 x,y limitation, the sequence length is multiple of 25 and that multiple determines the size of w. At a sequence size of 1600 symbols then w is 64. The depth of the array is what is called the lane size. The conversion in SHA-3 is $A(x,y,z)=S[w*(5*y+x)]=S[i]$. In accordance with an aspect of the present invention in $A(x,y,z)=S(i)$ $A(x,y,z)$ and $S(i)$ both represent a non-binary symbol. In one embodiment of the present invention each non-binary symbol is stored as a series of bits. For instance in the 5-state and 8-state case 3 bits are required and 16-state symbols require 4 bits per nonbinary symbol place while ASCII characters require 8 bits. In many computer languages, for instance like Matlab, one does not have to worry about the representation of the symbols as this in being taken care of by internal programs. For instance one can store A(1,2,4) as symbol 3 without first modifying it to binary. One must keep an eye on processing it with the correct n-state switching functions. If so desired, the nonbinary symbols can also be managed in their binary representation. For instance the 16-state symbol 3 is binary [0 0 1 1]. Array A can be defined as for instance A(5,5,64,4) wherein the fourth coordinate determines the number of bits. Entering the 16 state symbol 3 at (x,y,z)=(1,2,4) is in Matlab A(1,2, 4,)=[0 0 1 1].

The SHA-3 transformations have 2 types of processes: a state transformation and a coordinate transformation. Coordinate transformations in SHA-3 of binary data, such as the offset in 3.2.2 and the rotation in 3.2.3 are also applied to nonbinary symbols in accordance with an aspect of the present invention. State transformations in SHA-3 apply mainly the XOR function. For the n-state case with n>2 at least one n-state reversible function not being the radix-n addition or multiplication is used in accordance with an aspect of the present invention.

The SHA-3 step illustrated in FIG. 6 of FIPS 202 shows the use of an AND function with a NOT inverter at an input. The function that represents the operation of such a device is non-commutative and not reversible. In accordance with an aspect of the present invention in a nonbinary SHA-3 process in the nonbinary equivalent of the FIG. 6 of FIPS 202 operation a nonbinary, not reversible and non-commutative switching function is used. The following tables show 4-state examples of such switching functions:

| sc41n | 0 | 1 | 2 | 3 | sc42n | 0 | 1 | 2 | 3 |
|---|---|---|---|---|---|---|---|---|---|
| 0 | 2 | 3 | 0 | 1 | 0 | 0 | 0 | 0 | 1 |
| 1 | 1 | 1 | 1 | 0 | 1 | 0 | 1 | 1 | 2 |
| 2 | 0 | 2 | 0 | 0 | 2 | 0 | 2 | 0 | 3 |
| 3 | 2 | 0 | 0 | 0 | 3 | 0 | 1 | 2 | 3 |

5-state examples of such switching functions are provided below:

| sc51n | 0 | 1 | 2 | 3 | 4 | sc52n | 0 | 1 | 2 | 3 | 4 |
|---|---|---|---|---|---|---|---|---|---|---|---|
| 0 | 4 | 3 | 1 | 0 | 0 | 0 | 0 | 0 | 0 | 0 | 0 |
| 1 | 2 | 3 | 2 | 1 | 0 | 1 | 0 | 3 | 2 | 1 | 0 |
| 2 | 0 | 2 | 1 | 0 | 0 | 2 | 0 | 2 | 1 | 0 | 0 |
| 3 | 1 | 0 | 0 | 0 | 0 | 3 | 1 | 0 | 4 | 4 | 4 |
| 4 | 0 | 0 | 0 | 0 | 0 | 4 | 0 | 0 | 0 | 3 | 3 |

8-state examples of such switching functions are provided below:

| sc81n | 0 | 1 | 2 | 3 | 4 | 5 | 6 | 7 | sc82n | 0 | 1 | 2 | 3 | 4 | 5 | 6 | 7 |
|---|---|---|---|---|---|---|---|---|---|---|---|---|---|---|---|---|---|
| 0 | 7 | 6 | 5 | 4 | 3 | 2 | 1 | 0 | 0 | 5 | 6 | 5 | 4 | 3 | 2 | 1 | 0 |
| 1 | 1 | 5 | 5 | 5 | 0 | 0 | 0 | 0 | 1 | 1 | 5 | 5 | 5 | 0 | 0 | 0 | 0 |
| 2 | 2 | 6 | 5 | 7 | 2 | 1 | 0 | 0 | 2 | 0 | 6 | 5 | 5 | 2 | 1 | 0 | 0 |
| 3 | 0 | 4 | 5 | 6 | 0 | 0 | 0 | 0 | 3 | 0 | 4 | 5 | 6 | 0 | 0 | 0 | 0 |
| 4 | 3 | 0 | 1 | 2 | 0 | 0 | 0 | 0 | 4 | 3 | 0 | 1 | 2 | 0 | 0 | 0 | 0 |
| 5 | 4 | 3 | 2 | 1 | 0 | 0 | 0 | 0 | 5 | 4 | 3 | 2 | 1 | 0 | 0 | 0 | 0 |
| 6 | 5 | 6 | 1 | 1 | 2 | 0 | 0 | 0 | 6 | 5 | 6 | 1 | 1 | 2 | 0 | 5 | 5 |
| 7 | 6 | 0 | 0 | 0 | 0 | 0 | 0 | 0 | 7 | 6 | 0 | 0 | 0 | 0 | 3 | 4 | 7 |

There are thousands nonbinary not reversible and non-commutative switching functions for n=3 and n>3. For n=4 there are millions of these functions and for n=8 there are billions of these switching functions.

Accordingly, the nonbinary version of SHA-3 and its variants such as SHA3-224, SHA3-256, SHA3-384, SHA3-512, SHAKE128 and SHAKE256 and others have an enormous variation of implementation and execution due to the greater variance in switching functions that are used.

A nonbinary implementation using the same coordinate transformations as binary SHA-3 require the use of sequences of b nonbinary symbols. However b binary symbols are represented by b/3 8-state symbols in complete conversion. In the case of b=1600 this will require 534 8-state symbols. This means that the 1600 bit sequence is padded with 2 additional bits, for instance in a big-endian representation with added bits [0 0]. This means that and additional 1600-534 8-state symbols have to be provided. In one embodiment of the present invention the content of 2309 is expanded to 4800 bits before conversion by complete radix converters 2311 and 2313. This padding can be done by generating 3200 bits with a shift register based sequence generator. In one embodiment of the present invention an 8-state shift register based sequence generator is used. Or any other sequence generator for generating 3200 bits or 1600-534 8-state symbols is used. The generated content in 2309 is then padded with the additional 3200 bits or 1600-534 8-state symbols. In one embodiment of the present invention the original content and the padded content are interleaved or mixed by applying a transposition. Transpositions are disclosed in U.S. Pat. No. 7,930,331 issued on Apr. 19, 2011 to Lablans which is incorporated herein by reference. The sequences provided to 2314 have then the correct size to be processed for SHA-3 transformation. If the next phase reverts to binary, then a complete conversion of only a part of the 8-state transformation result of 2314 is required to extract 1600 bits. The modification of n from for instance binary to 8-state makes everything less predictable but requires additional steps such as padding and sequence generation.

One may also decide to perform the SHA-3 digest generation completely in n-state without reverting back to binary for other phases. It is clear that for n>3 the variation in possible switching functions is so great that cryptanalysis in a reasonable and useful time is very difficult. In accordance with an aspect of the present invention the SHA-3 and related message digest generations are performed on n-state symbols with n-state switching functions. The n-state processing in one embodiment of the present invention takes place on a number of n-state symbols equivalent or almost equivalent to the b binary symbols in the binary case. Some padding may be required to create 5 by 5 by w n-state diagram. For instance a 1600 bits sequence can be converted or interpreted to 200 bytes of 8 bits and processed with 256-state switching functions. The 200 bytes fit in a 5 by 5 state array of 256-state symbols with a depth w=8.

In accordance with an aspect of the present invention $n=2^p$ with $p>1$. This enables a further variation in possible switching functions. There is only one primitive polynomial $GF(2^2)$ which defines the elements of the finite field $GF(2^2=4)$. The elements of GF(4) are defined by the content and the order of the shift register of the sequence generator that defines the primitive polynomial. The switching function defined by the addition over GF(4) is provided in the table below.

| $+_{GF(4)}$ | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

The addition is constructed by using the binary representation of 4-state elements 0=[0 0]; 1=[0 1]; 2=[1 0] and 3=[1 1] and XORing the corresponding bits and replacing the binary result with the 4-state representation. Thus $3\oplus_{gf4}3 \rightarrow [1\ 1]$ XOR $[1\ 1]=[0\ 0]$ and $[0\ 0]=0$. Thus $3\oplus_{gf4}3 \rightarrow 0$. In another example: $3\oplus_{gf4}1 \rightarrow [1\ 1]$ XOR $[0\ 1] \rightarrow [1\ 0]=2$. In the 4-state case the normal counting of elements coincides with the order of elements in GF(4). This is no longer the case in the 8-state case. In the 8-state case there are 2 primitive polynomials that generate elements of $GF(2^3=8)$. The sequence generators determined by these primitive polynomials and starting with initial state [0 0 1] generate the following 2 series of unique 7 shift register states. The state [0 0 0] is a forbidden state and is not generated and is designated as the 0 element of the finite field GF(8).

| 8state | shift | register | | 8state | shift | register | |
|---|---|---|---|---|---|---|---|
| 0 | 0 | 0 | 0 | 0 | 0 | 0 | 0 |
| 1 | 0 | 1 | 0 | 1 | 0 | 1 | 0 |
| 2 | 1 | 0 | 1 | 2 | 0 | 0 | 1 |
| 3 | 1 | 1 | 0 | 3 | 1 | 0 | 0 |
| 4 | 1 | 1 | 1 | 4 | 1 | 1 | 0 |
| 5 | 0 | 1 | 1 | 5 | 1 | 1 | 1 |
| 6 | 0 | 0 | 1 | 6 | 0 | 1 | 1 |
| 7 | 1 | 0 | 0 | 7 | 1 | 0 | 1 |

Two aspects are immediately clear: 1) the actual decimal value of the 3 bits is different from the assigned value to the 3 bits; and 2) the two sequence generators generate two unique orders of shift register content. This leads to $3\oplus_{GF8}4 \rightarrow [1\ 1\ 0]$XOR$[1\ 1\ 1]=[0\ 0\ 1]=6$ in the first finite field GF(8) and $3 \oplus_{GF8} 4 \rightarrow [1\ 0\ 0]\text{XOR}[1\ 1\ 0]=[0\ 1\ 0]=1$ in the second field. The tables that represent the additions over these fields and the common binary to decimal representation are provided in the following tables.

| sc81 | 0 | 1 | 2 | 3 | 4 | 5 | 6 | 7 | sc82 | 0 | 1 | 2 | 3 | 4 | 5 | 6 | 7 | sc83 | 0 | 1 | 2 | 3 | 4 | 5 | 6 | 7 |
|---|---|---|---|---|---|---|---|---|---|---|---|---|---|---|---|---|---|---|---|---|---|---|---|---|---|---|
| 0 | 0 | 1 | 2 | 3 | 4 | 5 | 6 | 7 | 0 | 0 | 1 | 2 | 3 | 4 | 5 | 6 | 7 | 0 | 0 | 1 | 2 | 3 | 4 | 5 | 6 | 7 |
| 1 | 1 | 0 | 4 | 7 | 2 | 6 | 5 | 3 | 1 | 1 | 0 | 6 | 4 | 3 | 7 | 2 | 5 | 1 | 1 | 0 | 3 | 2 | 5 | 4 | 7 | 6 |
| 2 | 2 | 4 | 0 | 5 | 1 | 3 | 7 | 6 | 2 | 2 | 6 | 0 | 7 | 5 | 4 | 1 | 3 | 2 | 2 | 3 | 0 | 1 | 6 | 7 | 4 | 5 |
| 3 | 3 | 7 | 5 | 0 | 6 | 2 | 4 | 1 | 3 | 3 | 4 | 7 | 0 | 1 | 6 | 5 | 2 | 3 | 3 | 2 | 1 | 0 | 7 | 6 | 5 | 4 |
| 4 | 4 | 2 | 1 | 6 | 0 | 7 | 3 | 5 | 4 | 4 | 3 | 5 | 1 | 0 | 2 | 7 | 6 | 4 | 4 | 5 | 6 | 7 | 0 | 1 | 2 | 3 |
| 5 | 5 | 6 | 3 | 2 | 7 | 0 | 1 | 4 | 5 | 5 | 7 | 4 | 6 | 2 | 0 | 3 | 1 | 5 | 5 | 4 | 7 | 6 | 1 | 9 | 3 | 2 |
| 6 | 6 | 5 | 7 | 4 | 3 | 1 | 0 | 2 | 6 | 6 | 2 | 1 | 5 | 7 | 3 | 0 | 4 | 6 | 6 | 7 | 4 | 5 | 2 | 3 | 0 | 1 |
| 7 | 7 | 3 | 6 | 1 | 5 | 4 | 2 | 0 | 7 | 7 | 5 | 3 | 2 | 6 | 1 | 4 | 9 | 7 | 7 | 6 | 5 | 4 | 3 | 2 | 1 | 0 |

These switching tables are all commutative and reversible. They cannot be created from one another by applying one or more 8-state inverters. Furthermore, none of these tables represents a modulo-8 addition or multiplication. There are 8!=40320 reversible inverters. In accordance with an aspect of the present invention, each of the above tables is modified with a) a reversible 8-state inverter at one of two inputs; 2) with one reversible 8-state inverter at each of two inputs and 3) with a reversible 8-state inverter to modify an output of the above tables and 4) any combination of 8-state reversible inverters to modify an input and an output. This offers the possibility of over well 100,000 different functions.

The following tables show 2 8-state switching tables with the property that when 2 input states are both zero (0) then the output is not zero (0). In sc82m1 the output of switching table sc82 is modified by 8-state inverter inv8: [0 1 2 3 4 5 6 7]→[6 3 7 2 5 1 4 0]. Table sc82m2 is obtained by placing the 8-state inverter inv8 in the input that determines the rows of the switching table.

| sc82m1 | 0 | 1 | 2 | 3 | 4 | 5 | 6 | 7 | sc82m2 | 0 | 1 | 2 | 3 | 4 | 5 | 6 | 7 |
|---|---|---|---|---|---|---|---|---|---|---|---|---|---|---|---|---|---|
| 0 | 6 | 3 | 7 | 2 | 5 | 1 | 4 | 0 | 0 | 6 | 2 | 1 | 5 | 7 | 3 | 0 | 4 |
| 1 | 3 | 6 | 4 | 5 | 2 | 0 | 7 | 1 | 1 | 3 | 4 | 7 | 0 | 1 | 6 | 5 | 2 |
| 2 | 7 | 4 | 6 | 0 | 1 | 5 | 3 | 2 | 2 | 7 | 5 | 3 | 2 | 6 | 1 | 4 | 0 |
| 3 | 2 | 5 | 0 | 6 | 3 | 4 | 1 | 7 | 3 | 2 | 6 | 0 | 7 | 5 | 4 | 1 | 3 |
| 4 | 5 | 2 | 1 | 3 | 6 | 7 | 0 | 4 | 4 | 5 | 7 | 4 | 6 | 2 | 0 | 3 | 1 |
| 5 | 1 | 0 | 5 | 4 | 7 | 6 | 2 | 3 | 5 | 1 | 0 | 6 | 4 | 3 | 7 | 2 | 5 |
| 6 | 4 | 7 | 3 | 1 | 0 | 2 | 6 | 5 | 6 | 4 | 3 | 5 | 1 | 0 | 2 | 7 | 6 |
| 7 | 0 | 1 | 2 | 7 | 4 | 3 | 5 | 6 | 7 | 0 | 1 | 2 | 3 | 4 | 5 | 6 | 7 |

Both tables, due to the applied inversion inv8, now have the property that an input (0,0) results into an output not being 0. Table sc82m1 is commutative and reversible, table sc82m2 is non-commutative and reversible.

Each of these functions can be applied in any SHA-1, SHA-3 and any other method that applies a XOR function. In accordance with an aspect of the present invention, in known and novel hash functions that apply the XOR function for transformation, padding, accumulation or other purposes, either on single bits or bitwise on words of bits a modified 2-input/one output n-state switching function defined by an n by n table is applied, with n>2, n>4 or n>7. A modified function herein includes also the additions over GF(n). The n-state function with $n=2^p$ that merely represents bitwise XORing without a change in representation is not really a modified function. Thus using those functions like sc83 and $sc_{gf(4)}$ instead of bitwise XORing individual bits should no be used as it establishes no change. However, modifying those functions with n-state inverters, for instance reversible n-state inverters, excluding the identity will create a change. It has been shown that switching tables with $n=2^p$ offer significant variation. N-state functions and symbols with n being a power of 2 are explicitly embodiments of the present invention.

In the case of replacing XOR functions, it is preferable that the replacement functions are reversible. But in some cases the functions should be not reversible, such as the non-linear function in SHA-3 and the modification function $Ch(x, y, z)=(x \wedge y) \oplus (\neg x \wedge z)$, wherein $\wedge$ is the binary AND, $\oplus$ is the binary XOR and $\neg$ is the complementary inverter (changes 0 in 1 and 1 into 0). In case of an n-state conversion or modification a useful n-state alternative for the binary functions is required. One way to achieve that is to use a non-reversible n-state inverter and apply it to the states of a reversible n-state switching table. In accordance with an aspect of the present invention an n-state table that generates a carry symbol for an n-state addition mod-n is modified in accordance with an n-state inverter for instance a reversible n-state inverter. The following table shows a table for a 4-state carry generation and the same table modified with inverter [0 1 2 3]→[3 2 1 0] and the same for the 4-state multiplication.

| +c$_4$ | 0 | 1 | 2 | 3 | +c$_4$m | 0 | 1 | 2 | 3 | *c$_4$m | 0 | 1 | 2 | 3 | *c$_4$m1 | 0 | 1 | 2 | 3 |
|---|---|---|---|---|---|---|---|---|---|---|---|---|---|---|---|---|---|---|---|
| 0 | 0 | 0 | 0 | 0 | 0 | 3 | 3 | 3 | 3 | 0 | 0 | 0 | 0 | 0 | 0 | 3 | 3 | 3 | 3 |
| 1 | 0 | 0 | 0 | 1 | 1 | 3 | 3 | 3 | 2 | 1 | 0 | 0 | 0 | 0 | 1 | 3 | 3 | 3 | 2 |
| 2 | 0 | 0 | 1 | 1 | 2 | 3 | 3 | 2 | 2 | 2 | 0 | 0 | 1 | 1 | 2 | 3 | 3 | 2 | 2 |
| 3 | 0 | 1 | 1 | 1 | 3 | 3 | 2 | 2 | 2 | 3 | 0 | 0 | 1 | 2 | 3 | 3 | 2 | 2 | 1 |

A similar approach for the 8-state multiplication carry with inverter [0 1 2 3 4 5 6 7]→[7 6 5 4 3 2 1 0]:

| *c8 | 0 | 1 | 2 | 3 | 4 | 5 | 6 | 7 | *c8m | 0 | 1 | 2 | 3 | 4 | 5 | 6 | 7 |
|---|---|---|---|---|---|---|---|---|---|---|---|---|---|---|---|---|---|
| 0 | 0 | 0 | 0 | 0 | 0 | 0 | 0 | 0 | 0 | 7 | 7 | 7 | 7 | 7 | 7 | 7 | 7 |
| 1 | 0 | 0 | 0 | 0 | 0 | 0 | 0 | 0 | 1 | 7 | 7 | 7 | 7 | 7 | 7 | 7 | 7 |
| 2 | 0 | 0 | 0 | 0 | 1 | 1 | 1 | 1 | 2 | 7 | 7 | 7 | 7 | 6 | 6 | 6 | 6 |
| 3 | 0 | 0 | 0 | 1 | 1 | 1 | 2 | 2 | 3 | 7 | 7 | 7 | 6 | 6 | 6 | 5 | 5 |
| 4 | 0 | 0 | 1 | 1 | 2 | 2 | 3 | 3 | 4 | 7 | 7 | 6 | 6 | 5 | 5 | 4 | 4 |
| 5 | 0 | 0 | 1 | 1 | 2 | 3 | 3 | 4 | 5 | 7 | 7 | 6 | 6 | 5 | 4 | 4 | 3 |
| 6 | 0 | 0 | 1 | 2 | 3 | 3 | 4 | 5 | 6 | 7 | 7 | 6 | 5 | 4 | 4 | 3 | 2 |
| 7 | 0 | 0 | 1 | 2 | 3 | 4 | 5 | 5 | 7 | 7 | 7 | 6 | 5 | 4 | 3 | 2 | 2 |

These functions are also further modified by randomly changing a symbol so that at least all of the n-state symbols occur once.

As an illustrative example the following 8-state example is provided. One binary function in for instance SHA-1 is Ch(x, y, z)=(x ∧ y)⊕(¬ x ∧ z). In accordance with an aspect of the present invention the modified function is $Ch_8(x_8,y_8,z_8)$=sc8m21{*sc8($x_8,y_8$),*sc8m($x_8,z_8$)} wherein $x_8$, $y_8$ and $z_8$ are 8-state symbols and the functions switch in accordance with the above provided 8-state switching tables. The notation is as in Matlab, which means that first *sc8 and *sc8m are executed and their results are executed by sc8m21. In accordance with an aspect of the present invention different n-state functions are used during a round after being applied once or more. In certain cases the n-state switching functions are non-commutative, for instance when a commutative function is modified by one n-state inverter at an input or if two different inverters are used at the two inputs. When functions are non-commutative or non-associative different orders of execution may provide different results. A different order of non-commutative and/or non-associative functions creates a different configuration from another order. In accordance with an aspect of the present invention inputs (0,0) to a non-associative or non-commutative function will generate an output not being 0. This can be achieved by applying an n-state inverter that does not map 0 to 0 in an input or an output of a function of a function that maps (0,0) to 0.

Another, now 4-state, example relates to transformation function Maj (x,y,z)=(x ∧ y)⊕(x ∧ z)⊕(y ∧ z) in SHA-1 as defined in FIPS 180-2 section 4.1.1 is provided next. In accordance with an aspect of the present invention the function is modified to a 4-state transformation in accordance with: a1=*c4m($x_4,y_4$); b1=*c4m1($x_4,z_4$); c1=*c4m1($y_4,z_4$) and r1=$+_{GF(4)}$(a1,b1) and $Maj_4$=$+_{GF(4)}$(r1, c1). The switching tables of the 4-state switching functions are provided elsewhere herein. The symbols represented by $x_4$, $y_4$ and $z_4$ are 4-state symbols.

In another embodiment of the present invention a similar approach as in generating the addition over GF(n=$2^p$) is applied, by generating the elements of a field and then bitwise combining two binary representations of those elements with an ∧ (AND) or ∨ (OR) or any other binary two input functions, including non-commutative ones and converting the binary results to the correct value that the bits represent in the field. An example is provided in the tables below for the 8-state case using the 2 generated fields GF(8).

| gf81 | 0 | 1 | 2 | 3 | 4 | 5 | 6 | 7 | gf82 | 0 | 1 | 2 | 3 | 4 | 5 | 6 | 7 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 1 | 1 | 0 | 0 | 1 | 0 | 1 | 0 | 0 | 1 | 1 | 1 | 0 |
| 2 | 0 | 0 | 2 | 7 | 2 | 6 | 6 | 7 | 2 | 0 | 0 | 2 | 0 | 0 | 2 | 2 | 2 |
| 3 | 0 | 1 | 7 | 3 | 3 | 1 | 0 | 7 | 3 | 0 | 0 | 0 | 3 | 3 | 3 | 0 | 3 |
| 4 | 0 | 1 | 2 | 3 | 4 | 5 | 6 | 7 | 4 | 0 | 1 | 0 | 3 | 4 | 4 | 1 | 3 |
| 5 | 0 | 1 | 6 | 1 | 5 | 5 | 6 | 0 | 5 | 0 | 1 | 2 | 3 | 4 | 5 | 6 | 7 |
| 6 | 0 | 0 | 6 | 0 | 6 | 6 | 6 | 0 | 6 | 0 | 1 | 2 | 0 | 1 | 6 | 6 | 2 |
| 7 | 0 | 0 | 7 | 7 | 7 | 0 | 0 | 7 | 7 | 0 | 0 | 2 | 3 | 3 | 7 | 2 | 7 |

These functions in a further embodiment of the present invention are modified by an n-state inverter which preferably a reversible n-state inverter. In order to increase uncertainty in predicting a result the number of rounds in message digest as mentioned herein is increased, wherein additional rounds apply different functions and different set values where appropriate. For instance in SHA-1 there are 4 rounds of 20 steps. One can easily extend the SHA-1 process with one or more rounds of 20 steps. In SHA-3 one or more combination and transformation rounds are added to the message digest wherein addition modified functions as provided herein are used.

The above fields GF(4) and GF(8) are extension fields of GF(2). In a similar way other extension fields are created. The extension field is also a finite field and has all the properties of a finite field except for some properties. For instance, while an addition over GF(q) is an addition modulo-q, the addition over the extension field GF($q^p$) is not an addition modulo-$q^p$. Furthermore, the number of reversible n-state inverters is n! and becomes greater with greater values of n. With n=8 there are 40320 reversible inverters (including identity). For n=9 that number is 362,880. In order to provide the greatest number of possible ways to generate message digests, a high value of n for n-state functions should be applied. Furthermore, the n-state function that replaces the bitwise XOR or other functions, should be different for as many times as needed. For instance each step in SHA-3 in the transformation and in the combination phase has a bitwise XOR. When implementing n-state switching functions instead of bitwise XOR, preferably at least two different two input/single output n-state functions, more preferably at least three different two input/single output n-state functions, even more preferably at least four different two input/single output n-state functions are used, even more preferably at least five different two input/single output n-state functions are used, most preferably at least ten different two input/single output n-state functions are used with n>2. In one embodiment of the present invention each n-state 2 input/one output switching function is selected from at least n! different n-state switching functions. With higher values of n there are also more primitive polynomials that generate different fields. In accordance with an aspect of the present invention a replacement of a bitwise XOR function is selected from at least r*n! different n-state functions, wherein n is a number of different fields GF(n). If an SHA-3 method applies at least 5 bitwise XOR functions which each can be replaced by one of at least r*n! different n-state functions and there are k rounds of transformation (including the squeezing rounds) then the possible number of combinations of functions is $(r*n!)^k$.

The following table shows an addition over $GF(3^2=9)$:

| sc9 | 0 | 1 | 2 | 3 | 4 | 5 | 6 | 7 | 8 |
|-----|---|---|---|---|---|---|---|---|---|
| 0   | 0 | 1 | 2 | 3 | 4 | 5 | 6 | 7 | 8 |
| 1   | 1 | 5 | 3 | 8 | 7 | 0 | 4 | 6 | 2 |
| 2   | 2 | 3 | 6 | 4 | 1 | 8 | 0 | 6 | 7 |
| 3   | 3 | 8 | 4 | 7 | 5 | 2 | 1 | 0 | 6 |
| 4   | 4 | 7 | 1 | 5 | 8 | 6 | 3 | 2 | 0 |
| 5   | 5 | 0 | 8 | 2 | 6 | 1 | 7 | 4 | 3 |
| 6   | 6 | 4 | 0 | 1 | 3 | 7 | 2 | 8 | 5 |
| 7   | 7 | 6 | 5 | 0 | 2 | 4 | 8 | 3 | 1 |
| 8   | 8 | 2 | 7 | 6 | 0 | 3 | 5 | 1 | 4 |

Other additions over GF(9) and other reversible 9-state switching functions exists.

In a further embodiment of the present invention one or more n-state inverters, preferably reversible inverters are applied to modify all or part of an intermediate result during generating a message digest. The n-state inverters in SHA-1 are for instance applied after a round to the variables or to the intermediate digest. In the case of SHA-3 inverters are applied to all or part of the transformation before it is entered into a new round. How to generate large numbers of n-state inverters is disclosed in Ser. No. 62/299,935 filed on Feb. 25, 2016 which is incorporated herein by reference.

In accordance with an aspect of the present invention an n-state function used to determine a hash value is a multiplication over an alternate finite field as disclosed in U.S. Pat. No. 8,577,026 to Lablans issued on Nov. 5, 2013 and that is incorporated herein by reference.

A whole range of possible modifications in SHA-1 and related digests and SHA-3 and related digests and any other published hashing method that applies at least a XOR function and shift register based hashing, including moving from binary to n-state representation and modifying n-state functions. In accordance with an aspect of the present invention a modified hashing method applies preferably at least 2 different 2-input/single output n-state switching functions with n an integer greater than 2, applies more preferably at least 3 different 2-input/single output n-state switching functions with n an integer greater than 2, applies even more preferably at least 5 different 2-input/single output n-state switching functions with n an integer greater than 2, and applies most preferably at least 10 different 2-input/ single output n-state switching functions with n an integer greater than 2.

It is to be understood that all functions and converters act upon sequences of symbols. Accordingly each device as identified is a plurality of devices that operate in parallel or data are provided to single devices in a sequential or serial order.

The '999 patent shows that the computation with an electronic computer is a signal switching scheme that is known as a ripple adder. The circuits do not actually "calculate" anything as there is no awareness of symbols in a circuit. It switches signals in accordance with XOR and AND functions that coincide with radix-2 addition modulo-2 and carry determination modulo-2. The inventor at the time of the invention recognized that the "ripple adder" is fundamentally a switching circuit and not a calculating device in the sense of "knowing what it does" as a human would and wherein a reversible switching function and a transfer switching function are used. The inventor based on this insight invented other "accumulating" devices wherein signals representing two multi-digit words are combined by applying a ripple adder scheme wherein the applied switching functions are other than known modulo-n addition or subtraction (with n=2 or n>2) and known modulo-n carry or borrow functions. In one embodiment of the '999 patent, the inventor provides sets of modulo-n coding ripple adder schemes that correspond to a matching de-coding scheme. In accordance with an aspect of the present invention The generating function or aspects thereof preferably have non-associative and/or non-commutative and/or non-distributive properties.

In accordance with an aspect of the present invention hashing schemes that apply true addition equivalent to radix-2 or radix-n addition have the addition modified by using at least a modified carry or transfer symbol function as explained in the '999 patent. Preferably the function that determines the modular residue is also changes, preferably with one or more modifications as disclosed herein. True additions are for instance applied in SHA-1 and are truncated if the result exceeds a required number of symbols.

In one embodiment of the present invention a message digest generated with one modified method, such as a modified SHA-1, is further processed by another method such as a modified SHA-3 or shift register method.

Clearly with the methods provided herein it is possible to generate a message digest based on steps and devices disclosed herein which is unique and strong, and generally collision free and with strengths similar to the original method that was modified, but unpredictable certainly in a period which is preferably at least 1 hour, more preferably at least 2 hours, even more preferably at least 12 hours and most preferably longer than 24 hours. That is based on the known message and the known message digest it is not possible within the above defined period to derive the functions and other details of the applied steps in such a manner that a correct message digest for one or more other messages can be generated.

In general methods and devices that implement methods of message digest generation comply with published standards as mentioned earlier herein. Because of the properties of the standardized message digest there is little chance of generating a false digest. Unfortunately a strong digest itself does not protect against signal interception. The message may be padded with a secret code to generate the message digest. However differential cryptanalysis may crack that padding. As a secure alternative transmission and receiving equipment is used that applies hashing functions and message digest methods as described herein and that are held confidential or at least the switching functions that are applied.

In an embodiment of the present invention the hashing methods provided in accordance with various aspects of the present invention are implemented on two devices: an instigator 2400 and a separate responder 2411. In one embodiment of the present invention the steps of hashing are realized in combinational hardware, with exception of the actual switching functions which are stored in an addressable memory device. In a somewhat slower but conveniently programmable and thus easily upgradable and changeable configuration, memories and programmable processors are used. In a further embodiment the control is realized in FPGAs and actual switching functions are either stored in a programmable memory or in a relatively fixed memory like a ROM-like device.

The instigator 2400 starts the process, usually after being activated via an input device 2401, which may be a button, a screen, a placing in a reader or any other process that activates 2400. The device 2400 optionally has an output device such as a screen or a sound device. Device 2400 also has a communication module 2403 enabled to transmit signals from a processor to the outside world via a channel 2410 which may be a wired, wireless, optical, electrical, electromagnetic, magnetic, infrared, mechanical or electromechanical channel. The device 2403 includes sub-modules as known in the art, including signal conditioners, channel coders, modulators, an antenna and the like to render 2400 an operable device enabled to generate and transmit signals related to hashing values and/or message digests. Optionally device 2400 is bi-directional and is enabled to receive signals from channel 2410 via 2403 and provides the received data in processable form to processor 2404. Device 2400 has a body and a power supply and other common elements which are known to one of ordinary skill but are not shown to prevent obscuring other items. In one embodiment 2400 is portable and can easily be carried, like a fob for opening a door or activating mechanism such as a lock or a motor, a portable computing device such as a smartphone or tablet, or a credit-card type device to activate another computer controlled device such as an ATM machine or automatic teller machine or a credit card reader. In the case of a very small device like a credit card type the processor 2404 may be activated by inserting the card type device into a card reader which will provide mechanical wired contact and thus provides direct wired communication as well as electrical to power the processor and other modules. In the alternative device 2400 may include a solar cell or a battery to power the device. Device 2400 in one embodiment of the present invention can be connected to another device such as a smartphone via input 22401 which may be a USB connector.

Device 2400 may be itself a substantially static computer that is connected to the Internet and is used to access an external device. The external device may hold an account that has to be accessed or is itself a controlling computer that manages a security device such as an opening mechanism, data sources such as cameras or databases. For instance 2411 is part of a vehicle that has an activating mechanism such as a lock or starting mechanism in a vehicle such as a car. Device 2411 may be part of a fixed door. Device 2411 may be part of a computer that controls access to a database, for instance a database that is part of a financial account. Device 2411 may also be part of an ATM machine. In general 2411 is a computing device that controls access to a device or a datasource. Device 2411 may be a static device, a substantially static device that is movable but generally stays in one place for more than a week, or a mobile device such as a car, a truck, a bike, an aircraft or a boat. Device 2411 may be a portable computing device such as a smartphone.

Processor 2404 provides data to communication device 2403 to transmit the data over channel 2410. Device 2400 has a memory 2405 that stores a number of codes or indicia that each relates to a configuration of a hashing function or message digest module in accordance with one or more aspects provided herein.

There are many ways to create sub-modules at different levels of granularity that can be implemented on a processor. FIG. 25 and FIG. 26 show for instance part of the program in Matlab in 2 modules. FIG. 25 is a computer interface listing of a program to generate the message schedule of an 8-state SHA-1 message digest. FIG. 26 shows a computer interface with a listing of the actual performance of the switching functions. For convenience the actual switching functions are also listed. In one embodiment of the present invention the executable code to perform an 8-state SHA-1 based message digest is stored in memory 2406. The actual switching functions for such a digest are set in the configuration stored in 2405. An illustrative example of software has been provided in Matlab script. Matlab programs can be compiled into much faster executable files and stored in memory. Supporting libraries are also stored on memory to support execution of the executable files. Based on the setting in 2405 a configuration is selected or assembled.

In one embodiment of the present invention, memory 2405 has a list of configurations, each configuration being identified by a unique code. The code may be as simple as a number. However a code itself in accordance with an aspect of the present invention is meaningless in the sense that it does by itself not have any information about the configuration to which it pertains. With each code a meaningful code of a configuration is associated and stored in the memory 2405. The meaningful configuration has different fields that identify aspects of a hashing function or message digest. As a relatively simple illustrative example single modified functions are described. However, it should be clear that different approaches can be combined and mixed as long as one method can use data provided by another method.

Now referring to FIG. 27. This shows a diagram of a configuration and its identifying code or identification IDx. The memory fields corresponding to IDx include a field that provides the type of hash function, which in this example is a feedback shift register configuration 'FSR.' It may define an FSR-F for Fibonacci or FSR-G for Galois configuration. The modules or programs that perform this hashing function are retrieved from memory 2406 and loaded into the instruction memory of processor 2404. Field 'n' defines the state of the symbols and the switching functions. Field 'size' defines the length of the shift register. Field 'rounds' defines the number of rounds that the FSR is operate if not strictly depending on number of input symbols. Field 'initial' sets the initial content of the shift register. Field 'taps' sets the active taps of the feedback path. Fields 'f1' . . . 'fk' define the n-state functions in the signal path, wherein an n-state function may be an earlier disclosed n-state function that is optionally modified by one or more n-state inverters. In an embodiment of the present invention the parameters in the fields refer to a content of a memory 2409 in device 2401 of FIG. 24. For simplicity all rounds are assumed to be in a single state like 8-state. In a further embodiment it is defined that n is 8/9/8 with rounds 1/2/3 or round 1 is 8-state, round 2 is 9-state and round 3 is 8-state.

FIG. 28 shows a hashing configuration identified by IDy which defines a message digest according to the SHA-1 method modified to use n-state processing with n>2 with a word size 'size' to be executed in 'r' rounds with initial word and other values defined in 'initial' and k n-state functions in each round defined by f11 . . . f1k in round 1 to fr1 . . . frk in round k. The modules or programs that perform this hashing function are retrieved from memory 2407 and loaded into the instruction memory of processor 2404 and enable the processor to create a hash value from message data in accordance with the retrieved hashing configuration.

In a similar way the memory location defined by IDz in FIG. 29 defines a message digest or hashing configuration using the SHA-3 standard modified to be performed by n-state functions on n-state symbols. The modules or programs that perform this hashing function in accordance with the hashing configuration are retrieved from memory 2408 and loaded into the instruction memory of processor 2404. In accordance with an aspect of the present invention instructions related to any of the hash functions and message digest methods mentioned herein and modified to be performed by n-state switching tables are loaded on a memory that is to be retrieved and executed by a processor. In accordance with an aspect of the present invention other methods not described or mentioned herein that are performed with binary bitwise switching tables are also modified and stored as hashing configurations to be executed and performed by n-state switching functions and instructions thereto are loaded on a memory accessible to processor 2404 with related parameters to configure the hash function and related data stored in memory 2409.

In accordance with an aspect of the present invention a configuration exists of several sub-configurations. The output or hash value of a sub-configuration then serves as the input for the next sub-configuration. This is illustrated in FIG. 30 wherein at least an n1-state modified Keccak hashing method and a modified n2-state SHA512 method are used to generate a hash value. The processor in consecutive steps generates hash values in accordance with the sub-configurations.

In accordance with an aspect of the present invention all identification numbers are unique, so that no ID occurs twice. Preferably a hashing configuration corresponding to an ID is also unique so that no hashing configuration occurs twice. For larger values of n (n>4 or n>5) it should not be a problem at all to generate sufficient large numbers of different functions. There are sufficient opportunities to modify constants and initial values which also establishes a different configuration and to mix different sub-configurations of hashing configurations. One is also reminded that there are at least 50 different 4-state reversible functions which allows for 100s of millions of different hashing configurations.

In accordance with an aspect of the present invention the processor 2404 converts the finally generated message digest or hashing value in a common format and length such as hexadecimal, ASCII or decimal representation to be provided on 2410, if needed by truncating a generated hash value. By itself a malfeasant can then not derive any information of the applied hashing method from the hash value. In accordance with an aspect of the present invention an n-state symbol or at least one n-state symbol but preferably several n-state symbols in an intermediate result or a final result of hashing is modified by an n-state inverter, further rendering a hash value unpredictable.

The device 2412 also has one or more sensor or receiving modules 2412, which include one or more of the following: a radio receiver, GPS circuitry, a thermometer, a gyroscope, a magnetometer, a digital compass, an altimeter, a clock, a pressure sensor, a camera, a radiation sensor, an accelerometer, a microphone, a bio-sensor, an finger print sensor, a motion sensor or any other sensor that generates data from a physical phenomenon.

At the other side of a channel 2410 is receiving/responding device 2411 which has device 2421 being similar to 2401; 2422 being similar to 2402; 2423 being similar to 2403 and is also a receiver with all required elements to extract data for 2424, including amplifier, demodulator and decoder or any other device required to extract and provide data from a received signal; 2424 being similar to 2404; 2425 being similar to 2405; 2426 being similar to 2406; 2427 being similar to 2407; 2428 being similar to 2408; 2429 being similar to 2409; and 2432 being similar to 2412. Device 2411 is configured and enabled to receive at least an ID code related to a hash function or message digest over 2410 and retrieve and execute the hash function based on a received ID code and apply the hash function to required data. Received data can be stored in 2411 for instance in a memory available in 2411 for later retrieval and processing. Module 2440 is a signal/symbol comparator that compares a received hash value/message digest with an internally generated hash value/message digest and provides a signal that indicates if a received and an internally generated hash value are different or identical. When identical, a signal is provided on output 2422 that for instance activates a mechanism such as a lock, or unlocks access to an account or to a database. In one embodiment of the present invention, data stored on a device is used to be hashed based on a unique hashing configuration. In one embodiment of the present invention, the generated hash value is applied as a keyword for further data transmission.

In one embodiment of the present invention device 2400 is an activator of a mechanism such as a lock in a vehicle or a door in a building. Device 2400 may be a fob or part of a device such as a smartphone or a tablet or may be incorporated in a car such as a garage door opener. Preferably a lock is opened only by an authenticated device. It is known that signals of car door openers can be stolen and re-used by malfeasants. One way is to jam a signal so that a receiving device is unable to respond. The signal is then re-used later by the malfeasant. A solution to that in a one-way communication opener is to only use a unique opening code only once. After activating an ID code in 2400 for instance by activating an input device such as a push button, that unique code or a corresponding unique code retrieved from 2405 is transmitted to 2411 and then is removed from 2405 or at least disabled. Associated with the unique ID is a unique FSR sequence generator or a unique message digest message configuration and that is implemented and executed to create a sequence of symbols that are provided over 2410 to 2411. The unique code can be used as the message of which the hash value is determined or that is used at least as part of a seed of the FSR.

After activating 2400 a code is activated and is sent via channel 2410 to 2411. The code may be the unique ID or a code that is derived and unique related to the ID in such a way that the receiver can extract the unique ID from the received code. Expansion of the unique ID may involve error correcting coding.

Based on the unique ID the configuration of the hash function is retrieved and implemented using at least the ID as message or as initial setting to generate a hash value that is transmitted via channel 2410 to 2411. The received code caused 2424 to implement the corresponding hash function and to generate the related hash value as in 2400. The internally generated hash value in 2411 is compared with the received hash value to determine authenticity of validity of an opening command. If the same a mechanism is activated and for instance a door is unlocked. The relevant IDs after use are disabled both in 2400 and in 2411. If the signal was jammed by a malfeasant nothing happens and a user may press a button again. A malfeasant may stop jamming letting the car being opened with the next ID, in the hope to use the previously stolen signal. However, the IDs in one embodiment of the present invention are ordered and when a responder device receives and accepts an ID then all preceding codes are disabled. The configurations identified by IDs which are preferably unique and random by themselves do not disclose any information about the corresponding configurations. The configurations are stored in an ordered manner.

In order to make cryptanalysis more complicated and difficult, a secret supplement may be added to the ID as part of the message, that is however not included in the transmitted code. For instance all or part of the content of the memory corresponding to the unique ID may be combined with the ID to form the message from which a hash value is generated. A field containing a unique secret word or sequence may also be added to the memory and associated with the unique ID to be combined into a message from which the hash value is determined, both in 2400 and 2411. Additional messages may be derived from data obtained from 2412 and 2432. For this to work the data generated has to be identical. For instance one may take a reading from clocks in both 2400 and 2411 which are synchronized as part of a message. This may range from a date to a reading with an accuracy between 10 minutes to 1 minute, preferably with a secret offset.

Another source of data would be a digital compass. In case of a car a user of 2400 would have to align with a direction of the vehicle with 2411 to generate the correct data. Also in this case a secret offset is preferable. In a further embodiment it is required that an opener is held in a defined direction relative to a position of the car or vehicle, such as perpendicular or within a certain defined range relative to the car or in a position relative to the north position. In accordance with an aspect of the present invention a vehicle provides data to 2411 such as one of direction, speed, temperature, gas level and tire pressure or any data that is available from sensors in the vehicle. Data is accumulated in a weighed fashion. At one time the final number derived from sensor data is determined and stored both in 2400 and 2411, for instance at the time an engine is switched off, and is used as opening message data.

In one embodiment of the present invention the unique IDs and the corresponding hash values or message digests are generated off-line in accordance with methods of the present invention and are then stored in a memory on 2400 and 2411. The IDs and hash values can be matched after a transposition scrambling, so there is no longer a fixed relation between the ID and the generated hash value. This is computationally much cheaper. However there is a significant risk in theft of the database as no further additions to the message can be made and replacement of all related chips may be required rather than a update of software or database stored in 2409 and 2429 for instance.

A message herein is a series of signals representing a series of symbols, commonly a series of bits or binary symbols. A message may represent a text, a password, a sound, an image, numerical data or any series of data being represented as binary or non-binary symbols.

As explained earlier above, signal interception and modification, (man-in-the-middle) and other source impersonation are serious security risk in information exchange. A dual channel and further applications of methods and devices provided herein can reduce the risk of successful source impersonation. In accordance with an aspect of the present invention memories 2405 and 2425 store on additional fields related to a specific ID a second and different configuration of a hash function or hash digest generator. In accordance with a further aspect of the present invention the value of n and the n-state functions in the second configuration are different from the first configuration related to a unique ID. Device 2400 in provided with a sequence comparator 2450. After transmission of a message and its related hash value/message digest based on the first configuration, device 2401 generates a hash value/message digest by using the second (and different) configuration. This hash value is temporarily stored in memory for instance 2405. Device 2411 receives a message via 2423 with a hash value/message digest and generates the related hash value/message digest using the first configuration from 2425 and compares the calculated hash value/message digest with the received one using 2440. It generates a new hash value/message digest using the second configuration in 2425 and transmits it to 2400 that applies it to 2450 to determine if the received second hash value is identical to the calculated second hash value that was temporarily stored. If they are not identical the transaction that was underway is terminated. In accordance with an aspect of the present invention device 2400 terminates the transaction and stops responding to 2411. Device 2400 may also send a termination message that is for instance a code that is hashed with yet another hashing configuration to 2411. A time constraint not greater than 1 hour, preferably not greater than 30 minutes, more preferably not greater than 15 minutes and most preferably not greater than 1 minute may be applied as a criterion to terminate a transaction if not a correct second hash value was recognized. Because of the strength of the applied hash/message digest devices and methods provided herein it is extremely unlikely that the correct functions and configuration will be found within the time constraint that would provide a malfeasant the opportunity to surreptitiously modify a content of a message that may be a financial transaction. This aspect of the present invention is particularly useful in on-line financial transactions such as ordering products or transferring funds and prevents successful man-in-the-middle attacks. A transaction or instruction is also terminated when the first hash values as determined by 2400 and by 2411 are determined not to be identical.

In an embodiment of the present invention two-way communication and hashing is applied for activating a mechanism such as a lock to a car. In that case a third hashing configuration is used to generate a third hash value in 2400 and 2411, for instance on the second hash value. The processor 2411 determines if a locally generated third hash value matches a third hash value generated and sent by 2400. If the two third hash values do not match then no instruction, such as unlocking a door or money transfer is terminated.

Hashing is applied in many applications and is relied upon for one way generating from a source message a defined length message that is unique to the source message, no matter its length. One application is for storage of account information such as PIN numbers for accounts and credit card numbers and ATM card numbers. In many cases in a specific application the PIN number or credit number is not stored for checking such numbers for authentication. One problem is that by hacking those numbers could easily be stolen. One way to address such a vulnerability is to not store the actual numbers but their generated hash value. The theory behind this is that the 1-way functionality of hash/message digest functions should prevent reconstruction of the original message from the hash value. Because the hash value is unique and the PIN and credit card numbers or account numbers in general are limited in size it has been proven that the original message can be reconstructed. One way to increase the concern of length is to apply a "salt": a random number to which the PIN, credit card number or other account information is attached, usually concatenated. However, the "salt" has to be stored with the hash value, providing an additional risk. A credit card able to generate a hash value is known as a credit card, a chip card, a smart card or integrated circuit card (ICC), EMV card. For brevity the name chip card, meaning to contain processing capability and memory, will be used herein. A smart card can be physical contact making with a system or contactless (or wireless).

The term chip card also covers a SIM (subscriber identification module) card as used in for instance mobile and smartphones. A SIM card generally has a processor and memory but in some cases may only store data and uses a processor on for instance a cell phone.

A message that is hashed is often text or other data that is entered into the processor from outside the credit card or chip card. In other cases the message is data such as a PIN number or other data that is retrieved from a memory on the device that performs the hashing. In yet other cases the hash value is generated from data that may be available to a sender and a receiver and needs not to be sent and only the related hash value is exchanged.

The problem of cryptanalysis is that the actual hashing mechanism and related processes are known and may even be standardized. This is a strength of hashing but also a weakness because it opens the door to brute force reconstruction. It is not easy to create strong hashing methods into which considerable efforts have gone. One essential function in almost all hashing methods is the use of a binary reversible function, usually the XOR function. The XOR function can be extended to an addition over $GF(n=2^p)$. It has been shown earlier that there is more than 1 extension field $GF(n=2^p)$ for $n>4$ and in general for $GF(n)$.

In accordance with an aspect of the present invention any hash function or message digest method that applies a reversible binary switching function, which is usually the XOR function, to a binary symbol is modified to operate on an n-state symbol with an n-state function with at least 2-inputs and 1 output (which means that the output of the n-state switching function depends on 2 inputs) that is not a modulo-n addition or multiplication. If the hashing method applies a first addition over a field $GF(n=2^p)$ which is reduced to operate with XOR functions or in a look-up table then in accordance with an aspect of the present invention at least one second addition over a field $GF(n=2^p)$ different from the first addition is used. If the hashing method applies a first addition over a field $GF(n=q^p)$ then in accordance with an aspect of the present invention at least one second addition over a field $GF(n=q^p)$ different from the first addition is used. In accordance with an aspect of the present invention a hashing method that operates on binary symbols with binary switching functions is modified to operate on n-state symbols with n-state switching function, wherein at least 2 different 2-input/1 output n-state switching functions are used. In one embodiment of the present invention a 2-input/1 output n-state switching function is obtained from an n-state modulo-n addition or n-state addition over $GF(n)$ modified with at least one n-state inverter which may be reversible and may also be non-reversible. A modification may be the result of an n-state inverter at one or two inputs of the n-state switching function, a modification may also be the result of an n-state inverter at an output. In accordance with an aspect of the present invention an n-state inverter is a reversible n-state inverter. In accordance with an aspect of the present invention an n-state inverter is a non-reversible n-state inverter. In accordance with an aspect of the present invention an n-state inverter does not invert the symbol 0 to 0. In accordance with an aspect of the present invention an n-state 2-input/1 output switching function does not switch inputs 0 and 0 to output 0.

By keeping a basic structure of a hash function intact and by using n-state reversible 2-input/single output functions for n-state symbols it is likely that strong hashing properties in the modified methods will be maintained. By keeping modifications confidential between source and target, cryptanalysis by brute force becomes very cumbersome and time consuming and cannot be achieved successfully within a time frame to impersonate a source. In according with an aspect of the present invention a first hashing method has over 5 rounds or is modified to have more than 5 rounds or preferably more than 10 rounds or even more preferable over 25 rounds or most preferable over 50 rounds. In accordance with an aspect of the present invention a hashing method includes at least 2 different modified hashing methods wherein the first and second modified method operate for different n-state: an n1-state and an n2-state with n1 different from n2. In accordance with an aspect of the present invention a hashing method includes at least 2 different modified hashing methods wherein the first and second modified methods wherein the methods have different structures. For instance MD5, SHA-1, MD5, SHA-3, Whirlwind, SHA-512, PBKDF2, scrypt, bcrypt for instance, but not intended to be limiting, are all different methods. A structure has elements that can be identified by elements such as padding, initial or constant values, transposition, rotation, combining, permutation, addition, XORing, logic operations, conversion, absorbing, squeezing and that are performed in a predetermined order and manner.

The known hashing or message digest methods are also called standard hashing methods herein, because their structure and method is published and available in a publication. These standard hashing methods in accordance with various aspects of the present invention are modified and implemented on a computing device, in for instance combinational logic, FPGA, programmable processor with memory or combinations thereof or other implementations. The modifications are also held secret or confidential to only authorized devices and users. The possible variations in modifications and possible combinations of variations are so large that cryptanalysis or reverse engineering within a useful time period is not possible. Furthermore in accordance with an aspect of the present invention a specific hashing method based on the modifications is disabled after use. A new method based on different modifications becomes the next active hashing method. A re-use of a specific hashing method based on modifications in a specific device is not enabled in one embodiment, or is not enabled associated with a same ID code in another embodiment, or is only enabled after a sufficient large period of time, such as preferably after 100,000 used other hashing methods based on modifications or more preferably after at least 1 million used other hashing methods based of modifications in yet another embodiment.

A way to increase a size of an input message with a salt is to transpose the salt and the original message at least once in accordance with a pseudorandom sequence as disclosed in the earlier cited '331 patent. One can keep the salt in clear text in a database but keep the transposition confidential and change for instance on a time or other basis both at the receiver and the source.

In accordance with an aspect of the present invention a binary hashing function is modified so that each bit is replaced by an n-state symbol and each n-state symbol is processed by an n-state switching function. This will increase the size of the binary representation of the hash value. In accordance with another aspect of the present invention a binary hashing function is modified so that a plurality of bits in a binary hashing function is replaced by a single n-state symbol, for instance by complete conversion.

Devices that exchange hash values as provided in accordance with various aspects of the present invention may exchange data wirelessly or contactless, for instance via a channel with RF communication or optical communication. The channel may be an RF channel and communication such as Bluetooth, wireless USB, a GHz network as defined by an IEEE 802.11 standard, or a channel and communication as defined by the ISO/IEC 14443 standard for contactless smart chips, cell phone communication, direct RF connection and any relevant RF, optical and wireless communication protocol or technology. Devices may also be in contact that includes wired contact such as contact over the Internet defined by the TCP and IP protocol, Ethernet, wired IEEE 802.11 protocols, Internet of Things (IoT) protocols, compliant with relevant ITU standards and recommendations, USB connection, compliant with relevant EIA standards, compliant with the ISO/IEC 7816 standard and any other relevant standard or wired communication technology.

Processing herein takes place by physical switching devices which operate on signals. For convenience in representation the term symbols are used. A symbol and a state of a symbol reflect differences in actual signals. However one of ordinary skill understands that a signal represented by symbol 0 may not be 0 volt for instance and a symbol 1 is not necessarily a representation of 1 volt.

While a hash value is based on a message, which includes a credit card number, a password, a PIN, a number or any other data, it is not always strictly generated from the message data. As indicated, one may use additional data such as nonces and salts, sensor data, or secret keywords or certificates. Accordingly a hash value from a message or based on a message includes at least the message and may also include other data. The generated hash value will change when the message content changes.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (2) U.S. Non-Provisional patent application Ser. No. 10/936,181, filed Sep. 8, 2004, entitled TERNARY AND HIGHER MULTI-VALUE SCRAMBLERS/DESCRAMBLERS; (3) U.S. Non-Provisional patent application Ser. No. 10/912,954, filed Aug. 6, 2004, entitled TERNARY AND HIGHER MULTI-VALUE SCRAMBLERS/DESCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (6) U.S. Non-Provisional patent application Ser. No. 11/065,836 filed Feb. 25, 2005, entitled GENERATION AND DETECTION OF NON-BINARY DIGITAL SEQUENCES; (7) U.S. Non-Provisional patent application Ser. No. 11/139,835 filed May 27, 2005, entitled Multi-Valued Digital Information Retaining Elements and Memory Devices; (8) U.S. Non-Provisional patent application Ser. No. 12/137,945 filed on Jun. 12, 2008, entitled Methods and Systems for Processing of n-State Symbols with XOR and EQUALITY Binary Functions; (9) U.S. Non-Provisional patent application Ser. No. 11/679,316, filed on Feb. 27, 2007, entitled METHODS AND APPARATUS IN FINITE FIELD POLYNOMIAL IMPLEMENTATIONS; (10) U.S. Non-Provisional patent application Ser. No. 11/696,261, filed on Apr. 4, 2007, entitled BINARY AND N-VALUED LFSR AND LFCSR BASED SCRAMBLERS, DESCRAMBLERS, SEQUENCE GENERATORS AND DETECTORS IN GALOIS CONFIGURATION; (11) U.S. Non-Provisional patent application Ser. No. 11/964,507 filed on Dec. 26, 2007, entitled IMPLEMENTING LOGIC FUNCTIONS WITH NON-MAGNITUDE BASED PHYSICAL PHENOMENA; (12) U.S. Non-Provisional patent application Ser. No. 12/273,262, filed on Nov. 18, 2008, entitled Methods and Systems for N-state Symbol Processing with Binary Devices; (13) U.S. patent application Ser. No. 11/566,725, filed on Dec. 5, 2006, entitled ERROR CORRECTING DECODING FOR CONVOLUTIONAL AND RECURSIVE SYSTEMATIC CONVOLUTIONAL ENCODED SEQUENCES; (14) U.S. patent application Ser. No. 11/555,730 filed on Nov. 2, 2006, entitled SCRAMBLING AND SELF-SYNCHRONIZING DESCRAMBLING METHODS FOR BINARY AND NON-BINARY DIGITAL SIGNALS NOT USING LFSRs; (15) U.S. patent application Ser. No. 11/680,719 filed on Mar. 1, 2007, entitled MULTI-VALUED CHECK SYMBOL CALCULATION IN ERROR DETECTION AND CORRECTION; and (16) U.S. patent application Ser. No. 11/739,189 filed on Apr. 24, 2007, entitled ERROR CORRECTION BY SYMBOL RECONSTRUCTION IN BINARY AND MULTI-VALUED CYCLIC CODES.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention.

The invention claimed is:

1. A method for activating a device by authentication, comprising:
    modifying, by a server, a message digest method, by modifying an n-state switching function using p bitwise XOR functions with $n=2^p$, and n an integer greater than 2,
    wherein the message digest method is selected from a group of message digest methods consisting of MD5, MD6, SHA-1, SHA-2, SHA-3, BLAKE, Blue Midnight Wish, GOST, Grostl, Haval, CubeHash, ECHO, Fugue, Grostl, Hamsi, JH, Keccak, LANE, Luffa, Poly1305, Shabal, SHAvite-3, RIPEMD, SIMD, VMAC, UMAC, Snefru, RADIOGATUN, Whirlpool, Skein, Matyas-Meyer-Oseas, Davies-Meyer, Miyaguchi-Preneel and Merkle-Damgard;

generating, by the server, a plurality of hashing configurations from the modified message digest method;

distributing, by the server, the plurality of hashing configurations to a first computing device and a second computing device;

storing, by a processor of the first computing device, the plurality of hashing configurations on a memory of the first computing device;

storing, by a processor of the second computing device, the plurality of hashing configurations on a memory of the second computing device;

obtaining a message data, by the first computing device;

retrieving, by the processor of the first computing device, and from the memory of the first computing device, a first hashing configuration from the plurality of hashing configurations;

generating, by the processor of the first computing device, a first hash value from the message data, by executing the first hashing configuration on the message data;

transmitting, by the first computing device, the message data and the first hash value to the second computing device, via a communication channel;

receiving, by the second computing device, the message data and the first hash value;

retrieving, by the processor of the second computing device, the first hashing configuration from the memory of the second computing device;

generating, by the processor of the second computing device, a second hash value, by executing the first hashing configuration on the received message data;

comparing, by the processor of the second computing device, the first hash value with the second hash value;

activating the device, by the second computing device, based on the comparing; and upon activating the device,
  disabling, by the processor of the first computing device, access by the first computing device, to the first hashing configuration, and
  disabling, by the processor of the second computing device, access by the second computing device, to the first hashing configuration.

2. The method of claim 1,
wherein the plurality of hashing configurations are stored on the memory of the first computing device and on the memory of the second computing device in an ordered sequence, and wherein the disabling further comprises:
  disabling, by the processor of the first computing device, access by the first computing device to hashing configurations preceding the first hashing configuration in the ordered sequence; and
  disabling, by the processor of the second computing device, access by the second computing device, to hashing configurations preceding the first hashing configuration in the ordered sequence.

3. The method of claim 1, wherein the first computing device is selected from the group consisting of a fob, a door opener, a smartphone, a computer tablet, a SIM (subscriber identification module) card, a lap top computer and a chip card.

4. The method of claim 1, wherein the second computing device is selected from the group consisting of: a mechanism controller, a lock controller, an automatic teller machine and a credit card reader.

5. The method of claim 1, wherein the activated device is a motor.

6. The method of claim 1, wherein the activated device is a lock.

7. The method of claim 1, wherein the activated device is an Automatic Teller Machine (ATM).

8. The method of claim 1, wherein the activated device is a motor of a garage door.

9. The method of claim 1, wherein the activated device is a processor that is activated for processing a financial transaction.

10. The method of claim 1, further comprising:
retrieving, by the processor of the second computing device, a second hashing configuration from the memory of the second computing device;

generating, by the processor of the second computing device, a third hash value, by executing the second hashing configuration on the received message data;

transmitting, by the second computing device, the third hash value to the first computing device, via the communication channel;

receiving, by the first computing device, the third hash value;

retrieving, by the processor of the first computing device, the second hashing configuration from the memory of the first computing device;

generating, by the processor of the first computing device, a fourth hash value from the message data, by executing the second hashing configuration on the message data;

comparing by the processor of the first computing device the received third hash value with the fourth hash value; and activating the device, by the first computing device, based on the comparing.

11. A method for activating a device by authentication, comprising:
modifying, by a server, a message digest method, by modifying an n-state switching function using p bitwise XOR functions with $n=2^p$, and d n an integer greater than 2, generating, by the server, a plurality of hashing configurations from the modified message digest method;

distributing, by the server, the plurality of hashing configurations to a first computing device and a second computing device;

storing, by a processor of the first computing device, the plurality of hashing configurations on a memory of the first computing device;

storing, by a processor of the second computing device, the plurality of hashing configurations on a memory of the second computing device;

obtaining a message data, by the first computing device;

retrieving, by the processor of the first computing device and from the memory of the first computing device, a first hashing configuration from the plurality of hashing configurations;

generating, by the processor of the first computing device, a first hash value from the message data, by executing the first hashing configuration on the message data;

transmitting, by the first computing device, the message data and the first hash value to the second computing device, via a communication channel;

receiving, by the second computing device, the message data and the first hash value;

retrieving, by the processor of the second computing device, the first hashing configuration from the memory of the second computing device;

generating, by the processor of the second computing device, a second hash value, by executing the first hashing configuration on the received message data;

comparing, by the processor of the second computing device, the first hash value with the second hash value;

activating the device, by the second computing device, based on the comparing; and upon activating the device,
- disabling, by the processor of the first computing device, access by the first computing device, to the first hashing configuration, and
- disabling, by the processor of the second computing device, access by the second computing device, to the first hashing configuration.

12. The method of claim 11, wherein the message digest method is selected from a group of message digest methods at least consisting of MD5, MD6, SHA-1, SHA-2, SHA-3, Keccak and Merkle-Damgard.

13. The method of claim 11, wherein the message digest method is selected from a group of message digest methods at least consisting of MD5, MD6, SHA-1, SHA-2, SHA-3, BLAKE, Blue Midnight Wish, GOST, Grostl, Haval, Cube-Hash, ECHO, Fugue, Grostl, Hamsi, JH, Keccak, LANE, Luffa, Poly1305, Shabal, SHAvite-3, RIPEMD, SIMD, VMAC, UMAC, Snefru, RADIOGATUN, Whirlpool, Skein, Matyas-Meyer-Oseas, Davies-Meyer, Miyaguchi-Preneel and Merkle-Damgard.

14. The method of claim 11,
wherein the plurality of hashing configurations are stored on the memory of the first computing device and on the memory of the second computing device in an ordered sequence, and wherein the disabling further comprises:
- disabling, by the processor of the first computing device, access by the first computing device to hashing configurations preceding the first hashing configuration in the ordered sequence; and
- disabling, by the processor of the second computing device, access by the second computing device, to hashing configurations preceding the first hashing configuration in the ordered sequence.

15. The method of claim 11, wherein the first computing device is selected from the group consisting of a fob, a door opener, a smartphone, a computer tablet, a SIM (subscriber identification module) card, a lap top computer and a chip card.

16. The method of claim 11, wherein the second computing device is selected from the group consisting of: a mechanism controller, a lock controller, an automatic teller machine and a credit card reader.

17. The method of claim 11, wherein the activated device is a car lock.

18. The method of claim 11, wherein the activated device is a processor that is activated for processing a financial transaction.

* * * * *